(12) United States Patent
Lius et al.

(10) Patent No.: US 11,373,432 B2
(45) Date of Patent: Jun. 28, 2022

(54) ELECTRONIC DEVICE AND METHOD OF PERFORMING FINGERPRINT RECOGNITION USING ELECTRONIC DEVICE

(71) Applicant: InnoLux Corporation, Miao-Li County (TW)

(72) Inventors: Chandra Lius, Miao-Li County (TW); Kuan-Feng Lee, Miao-Li County (TW); Nai-Fang Hsu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 44 days.

(21) Appl. No.: 16/991,007

(22) Filed: Aug. 11, 2020

(65) Prior Publication Data

US 2021/0081638 A1 Mar. 18, 2021

(30) Foreign Application Priority Data

Sep. 12, 2019 (CN) .......................... 201910863636.1

(51) Int. Cl.
*G06V 40/13* (2022.01)
*G02F 1/1335* (2006.01)
*G02F 1/1333* (2006.01)

(52) U.S. Cl.
CPC ...... *G06V 40/1318* (2022.01); *G02F 1/13338* (2013.01); *G02F 1/133512* (2013.01)

(58) Field of Classification Search
CPC .............. G06K 9/0004; G02F 1/13338; G02F 1/133512; G06V 40/1318
See application file for complete search history.

(56) References Cited

U.S. PATENT DOCUMENTS

| | | | | |
|---|---|---|---|---|
| 2016/0266695 A1* | 9/2016 | Bae | ...................... | G06F 3/04166 |
| 2019/0171050 A1* | 6/2019 | Chen | ...................... | G02B 6/0076 |
| 2019/0197286 A1* | 6/2019 | Kim | ...................... | H01L 27/3225 |
| 2019/0354740 A1* | 11/2019 | Li | ...................... | H01L 51/5237 |
| 2019/0371865 A1* | 12/2019 | Lee | ...................... | H01L 27/3276 |
| 2020/0279087 A1* | 9/2020 | Seo | ...................... | G01S 7/5202 |
| 2021/0326570 A1* | 10/2021 | Liu | ...................... | G06K 9/00087 |

* cited by examiner

*Primary Examiner* — Antonio Xavier
(74) *Attorney, Agent, or Firm* — Winston Hsu

(57) ABSTRACT

An electronic device viewable from a viewing side is disclosed. The electronic device includes a first substrate, a second substrate, a display unit, a sensor unit and a first light blocking layer. The second substrate is disposed between the first substrate and a viewing side of the electronic device. The display unit is disposed between the first substrate and the second substrate. The sensor unit is disposed on the second substrate. The first light blocking layer is disposed between the sensor unit and the viewing side.

5 Claims, 22 Drawing Sheets

ELECTRONIC DEVICE AND METHOD OF PERFORMING FINGERPRINT RECOGNITION USING ELECTRONIC DEVICE

BACKGROUND OF THE DISCLOSURE

1. Field of the Disclosure

The present disclosure relates to an electronic device and a method of performing fingerprint recognition using an electronic device, and more particularly to an electronic device capable of improving the signal to noise ratio and a related fingerprint recognition method.

2. Description of the Prior Art

In recent years, with the progress of technology, information products may have fingerprint recognition function to protect the user data. However, ambient light and light generated by information products themselves may affect the accuracy of fingerprint recognition, so how to improve the performance of fingerprint recognition is still an issue that needs continuous efforts in the industry.

SUMMARY OF THE DISCLOSURE

One of the objects of the present disclosure is to provide an electronic device and a method of performing fingerprint recognition. Since the electronic device includes a light blocking layer, the light noise entering a sensor unit can be reduced, and the signal to noise ratio can be further increased, thereby improving the performance of fingerprint recognition.

An embodiment of the present disclosure provides an electronic device, which is viewable from a viewing side. The electronic device of the present disclosure includes a first substrate, a second substrate, a display unit, a sensor unit and a first light blocking layer. The second substrate is disposed between the first substrate and the viewing side. The display unit is disposed between the first substrate and the second substrate. The sensor unit is disposed on the second substrate. The first light blocking layer is disposed between the sensor unit and the viewing side.

An embodiment of the present disclosure provides a method of performing fingerprint recognition by using an electronic device, comprising: providing an electronic device, wherein the electronic device comprises a sensor unit, a light emitting unit and a signal processing unit; starting a fingerprint recognition mode; enabling the light emitting unit to produce a light with intermittent intensity; the sensor unit sending a light sensing signal that is sensed to the signal processing unit; and the signal processing unit distinguishing an intermittent signal from the light sensing signal and converting the intermittent signal into a fingerprint recognition data.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show only a portion of the device, and certain components in drawings may not be drawn to scale. In addition, the number and dimension of each component shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". When the terms "include", "comprise" and/or "have" are used in the description of the present disclosure, the corresponding features, areas, steps, operations and/or components would be pointed to existence, but not limited to the existence or increase of one or a plurality of the corresponding or other features, areas, steps, operations, components and/or combinations thereof. When the corresponding component or layer is referred to as being "on" or "connected to" another component or layer, it may be directly on or directly connected to the other component or layer, or intervening components or layers may be presented. In contrast, when the corresponding component or layer is referred to as being "directly on" or "directly connected to" another component or layer, there are no intervening components or layers presented.

Although the terms such as "first", "second", "third" and so on is used to describe or may be used to describe or name different members, such members are not limited to these terms. These terms are used to distinguish one member from other members in the description and are not related to the manufacturing sequence of such members. The same terms may not be used in the claims, and "first", "second", "third" and so on may be substituted according to the claiming sequence of the members in the claims. Accordingly, in the following description, the first member may be a second member in the claims.

It should be noted that the technical features in different embodiments described in the following can be replaced, recombined, or mixed with one another to constitute another embodiment without departing from the spirit of the present disclosure.

Figure 1:
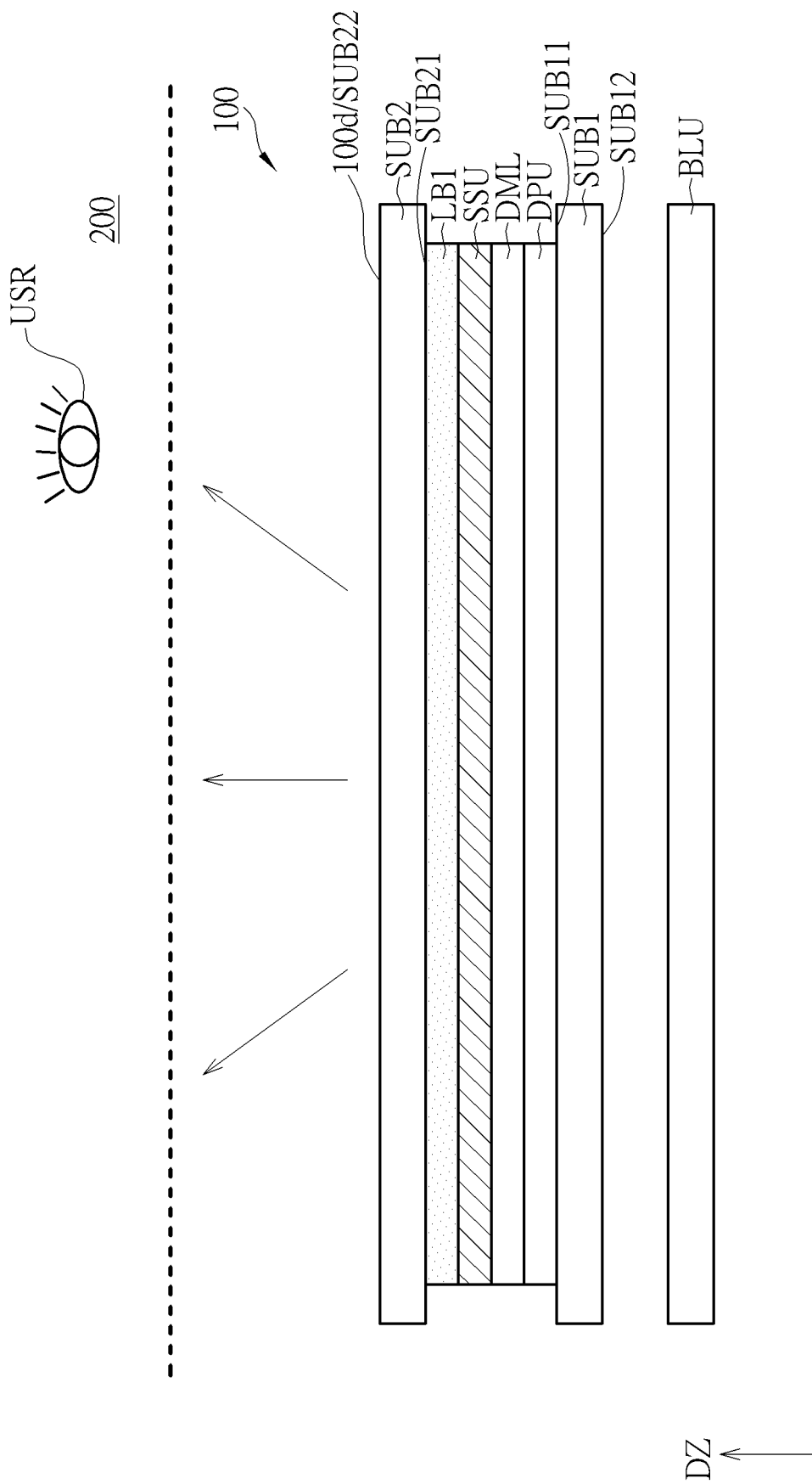
FIG. 1 is a schematic cross-sectional view of a first embodiment of an electronic device according to the present disclosure.
Figure 2:
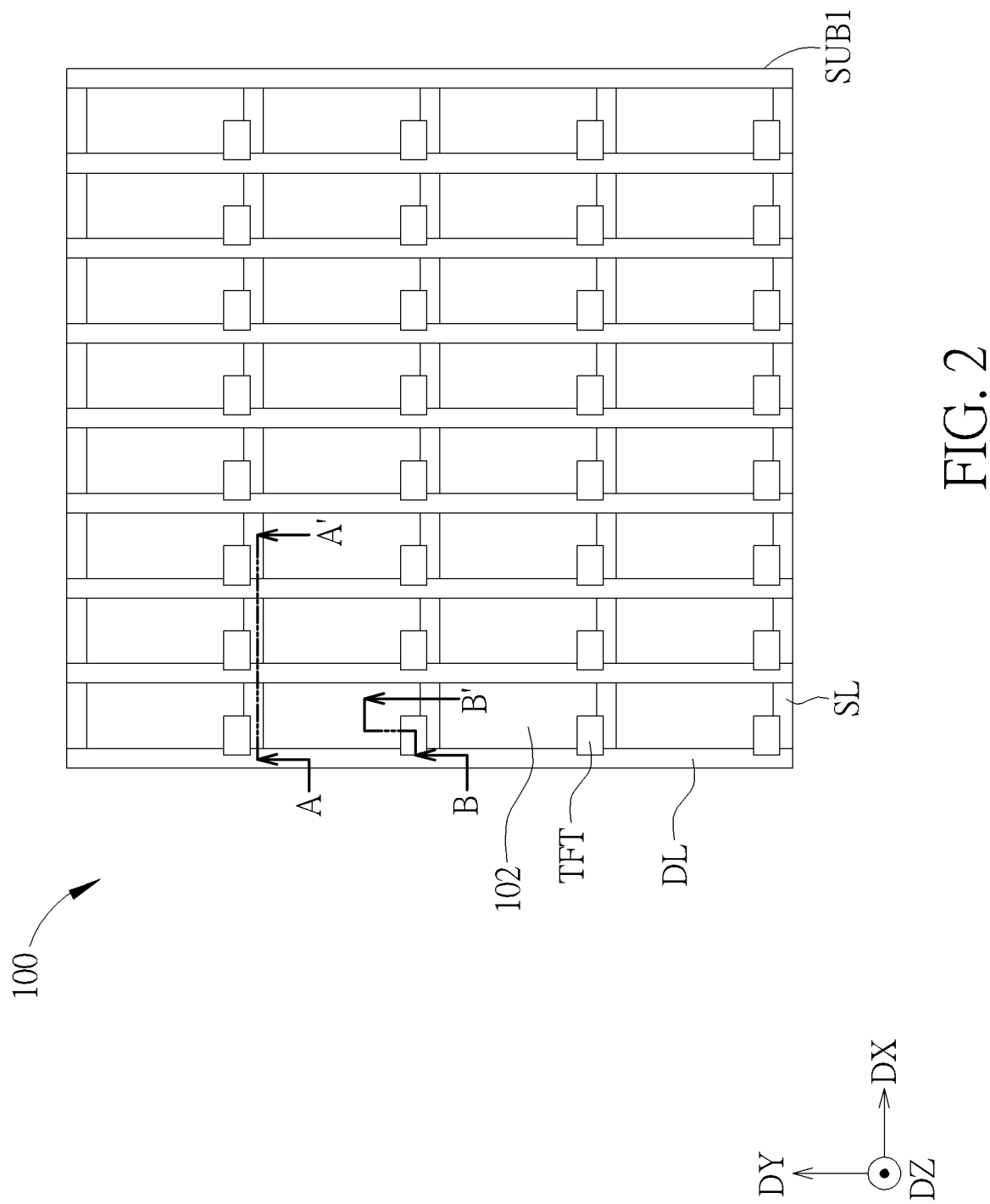
FIG. 2 is a schematic top-view of a first substrate of the electronic device shown in FIG. 1.
Figure 3:
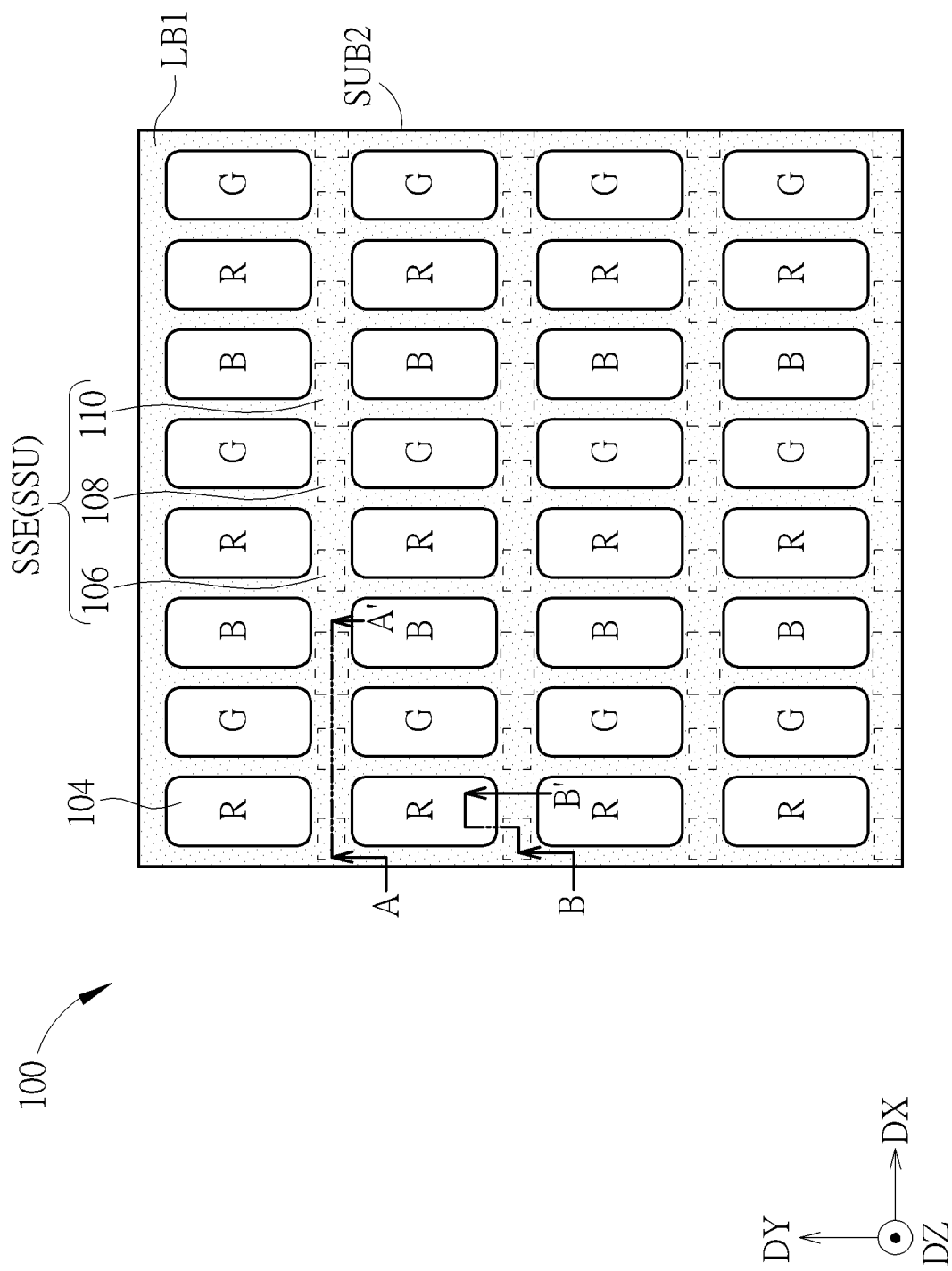
FIG. 3 is a schematic top-view of a second substrate of the electronic device shown in FIG. 1.
Figure 4:
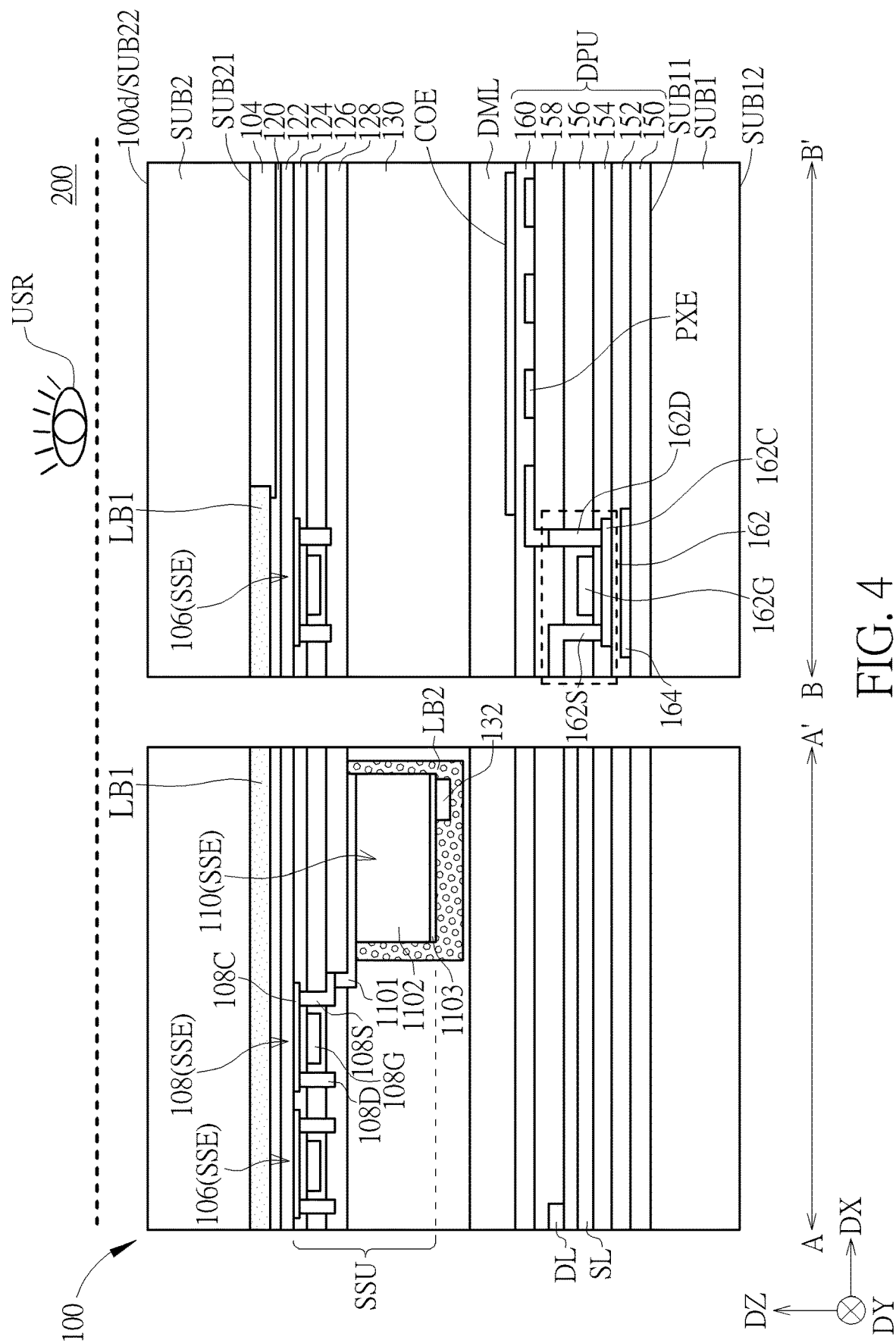
FIG. 4 is an enlarged partial cross-sectional view of the electronic device shown in FIG. 1.

Please refer to FIG. 1 to FIG. 4. FIG. 1 is a schematic cross-sectional view of a first embodiment of an electronic device according to the present disclosure. FIG. 2 is a schematic top-view of a first substrate of the electronic device shown in FIG. 1. FIG. 3 is a schematic top-view of a second substrate of the electronic device shown in FIG. 1. FIG. 4 is an enlarged partial cross-sectional view of the electronic device shown in FIG. 1, and shows the cross-sectional structures along line A-A' and line B-B' in FIG. 2 and FIG. 3. As shown in FIG. 1, an electronic device 100 of a first embodiment of the present disclosure is viewable from a viewing side 200, that is, a surface of the electronic device 100 closest to the viewing side 200 can be regarded as a display surface 100d (a top surface of the electronic device 100 in FIG. 1) of the electronic device 100, and a user USR may view the display surface 100d of the electronic device 100 from the viewing side 200 to enjoy images or pictures displayed by the electronic device 100. A direction DZ represents a direction that the display surface 100d faces the user USR. It should be noted that, in FIG. 1, the display surface 100d is at the side of the electronic device 100 closest to the user USR. A person skilled in the art may easily understand that the display surface 100d may face different directions depending on the installation position or application environment of the electronic device 100.

The electronic device 100 includes a first substrate SUB1, a second substrate SUB2, a display unit DPU and a sensor unit SSU. The second substrate SUB2 is disposed between the first substrate SUB1 and the viewing side 200, and the display unit DPU is disposed between the first substrate SUB1 and the second substrate SUB2, for example, formed on an upper surface SUB11 of the first substrate SUB1. The display unit DPU may be used to control a display media layer DML. It should be noted that, although FIG. 1 shows the display unit DPU in one layer, the display unit DPU may include (but is not limited to) a plurality of layers, a plurality of switch elements and a plurality of traces, and these switch elements and traces may be respectively disposed in different layers of the display unit DPU.

The sensor unit SSU is disposed between the first substrate SUB1 and the second substrate SUB2. In some embodiments, the sensor unit SSU may be disposed on the second substrate SUB2, that is, the sensor unit SSU is disposed on a surface of the second substrate SUB2 or at a position that is close to the surface of the second substrate SUB2, for example, disposed on a lower surface SUB21 of the second substrate SUB2, as shown in FIG. 1. In other embodiments, the sensor unit SSU may be disposed on an upper surface SUB22 of the second substrate SUB2. It should be noted that, although FIG. 1 shows the sensor unit SSU in one layer, the sensor unit SSU may include (but is not limited to) a plurality of layers, a plurality of sensing elements, driving elements and/or reading elements, and these elements may be respectively disposed in different layers.

Furthermore, the electronic device 100 further includes a first light blocking layer LB1 disposed between the sensor unit SSU and the viewing side 200, and the first light blocking layer LB1 may be disposed on the surface of the second substrate SUB2, for example, disposed on the lower surface SUB21 of the second substrate SUB2, as shown in FIG. 1. In other variant embodiments, the first light blocking layer LB1 may be disposed on the upper surface SUB22 of the second substrate SUB2, that is to say, the second substrate SUB2 is between the first light blocking layer LB1 and the sensor unit SSU, but not limited thereto.

As an example, the electronic device 100 shown in FIG. 1 includes a liquid crystal display device, which may include a light emitting unit, a backlight module BLU and a display media layer DML. The backlight module BLU is on a side of the first substrate SUB that is opposite to the side that second substrate exists, that is, the first substrate SUB1 is between the second substrate SUB2 and the backlight module BLU. In FIG. 1, the backlight module BLU is adjacent to a lower surface SUB12 of the first substrate SUB1. In the electronic device shown in FIG. 1, the display media layer DML may be a liquid crystal layer, but not limited thereto. In some embodiments, the display media layer DML may include an organic light emitting diode (OLED), a light emitting diode (LED), such as a micro light-emitting diode (micro LED) or a mini light-emitting diode (mini LED), a quantum dot light-emitting diode (QLED/QDLED), plasma, quantum dots, fluorescent materials, phosphorescent materials, other suitable materials or combinations of the above-mentioned materials, but not limited thereto. It should be noted that, when the display media layer DML of the electronic device 100 is self-light emitting materials, the backlight module BLU may be omitted.

The electronic device 100 of the present disclosure may include a display device, a tiled device, a light emitting device, a sensing device, an antenna device, other appropriate devices or combinations of the above-described devices, but not limited thereto. The tiled device may be, for example, a device tiled by a plurality of displays or tiled by a display and other devices such as antenna device and sensing device, but not limited thereto. When the electronic device 100 is not a display, the display unit DPU may be replaced with a circuit array unit, and the display media layer DML may be omitted. Furthermore, the electronic device 100 of the present disclosure may be a curved-surface electronic device or a bendable electronic device, among which the bendable electronic device refers to an electronic device that may be curved, bent, folded, stretched, flexed or other similarly transformed. In other words, when operating, the electronic device may have a curved surface or present a bending state, and the electronic device may have a fixed curved surface shape or have different bending states according to the using requirements. According to different applications, the first substrate SUB1 and the second substrate SUB2 of the electronic device 100 may include corresponding materials, such as a hard substrate or a soft and flexible substrate. The hard substrate may be, for example, a glass substrate, a quartz substrate or a sapphire substrate, and the soft and flexible substrate may be, for example, a polyimide (PI) substrate, a polycarbonate (PC) substrate or a polyethylene terephthalate (PET) substrate, but not limited thereto.

Please refer to FIG. 2 and FIG. 4, among which the backlight module BLU is omitted in FIG. 4. The display unit DPU may be disposed on the surface SUB11 of the first substrate SUB1, and the display unit DPU may include a plurality of data lines DL and a plurality of scan lines SL. The data lines DL may extend along the direction DY, the scan lines SL may extend along the direction DX, and the extending directions of the data lines DL and the scan lines SL are different. The data lines DL and the scan lines SL may be intersected with each other and may generally define a plurality of sub-pixels 102 (such as the regions between the data lines DL and the scan lines SL). The sub-pixels 102 may respectively have a corresponding switch element TFT electrically connected to a corresponding data line DL, a corresponding scan line SL and a corresponding pixel electrode PXE (illustrated in FIG. 4) to control the states of the sub-pixels 102.

Please refer to FIG. 4. In the present disclosure, the switch element TFT may be a thin-film transistor 162 for example. The thin-film transistor 162 may include a gate 162G, a source 162S, a drain 162D, a semiconductor layer 162C and a gate insulating layer 154. The gate 162G may be electrically connected to the scan line SL, the source 162S may be electrically connected to the data line DL, and the drain 162D may be electrically connected to the pixel electrode PXE. The semiconductor layer 162C may include low temperature poly silicon (LTPS) materials, metal oxide materials or other suitable semiconductor materials. Different thin-film transistors 162 may include semiconductor layers 162C of different materials, but not limited thereto. The gate 162G and the scan line SL may be formed by a first metal layer, the source 162S, the drain 162D and the data line DL may be formed by a second metal layer, and the pixel electrode PXE may include a first transparent conductive layer. A common electrode COE may be disposed on the pixel electrode PXE. The pixel electrode PXE and the common electrode COE may be insulated by an insulating layer 160, and the common electrode COE may include a second transparent conductive layer. A light shielding layer 164 may be further disposed on the upper surface SUB11 of the first substrate SUB1, and the light shielding layer 164 is between the semiconductor layer 162C and the first substrate SUB1. The light shielding layer 164 includes opaque materials, such as metals, but not limited thereto. The display unit may further include a first buffer layer 150, a second buffer layer 152, an insulating layer 156 and an insulating layer 158. The first buffer layer 150 may be disposed between the light shielding layer 164 and the first substrate SUB1, and the second buffer layer 152 may be disposed between the light shielding layer 164 and the semiconductor layer 162C. The insulating layer 156 and the insulating layer 158 covers the gate 162G, and the insulating layer 158 may be between the pixel electrode PXE and the source 162S. It should be noted that, the display unit DPU may further include other elements or conducting wires, not limited to the content shown in FIG. 4. In addition, the structure illustrated in FIG. 2 to FIG. 4 is an example, and the structure of the electronic device of the present disclosure is not limited thereto.

Please refer to FIG. 3 and FIG. 4. The first blocking layer LB1 and the sensor unit SSU may be disposed on the surface of the second substrate SUB2. The sensor unit SSU is disposed between the second substrate SUB2 and the display unit DPU, and the sensor unit SSU may include a plurality of sensing elements SSE. The plurality of sensing elements SSE may respectively include a driving transistor 106, a reading transistor 108 and a sensor 110, but not limited thereto. For example, the reading transistor 108 may include a gate 108G, a source 108S, a drain 108D, a semiconductor layer 108C and a gate insulating layer 124. The driving transistor 106 may include a similar structure, the film materials of the driving transistor 106 may refer to the thin-film transistor 162 described above, and are not redundantly described herein. It should be noted that, the position of the driving transistor 106 or the reading transistor 108 may not necessarily correspond to the position of the switch element TFT of the sub-pixel. In FIG. 4, it shows the sensor unit SSU may include a metal layer adjacent to the display unit DPU and the metal layer is opaque. To be more specific, The sensor 110 may be, for example, a PIN semiconductor sensor, including an upper electrode 1101, a semiconductor layer 1102 and a lower electrode 1103 adjacent to the display unit DPU for example. The semiconductor layer 1102 may include N-type semiconductor layer, an intrinsic semiconductor layer or a P-type semiconductor layer, and the upper electrode 1101 and the lower electrode 1103 may include a transparent conductive layer and/or an opaque conductive layer, such as metals, but the structure and the material of the sensor 110 of the present disclosure are not limited to those described above. In some embodiments, the upper electrode 1101 may be electrically connected to the reading transistor 108, and the lower electrode 1103 may be electrically connected to a bias line 132. The first light blocking layer LB1 may be disposed on the lower surface SUB21 of the second substrate SUB2, that is, disposed between the second substrate SUB2 and the sensor unit SSU. In a top view of the electronic device 100, the first light blocking layer LB1 covers at least one portion of the sensing element SSE. That is to say, in the direction DZ, the first blocking layer LB1 at least partially overlaps the sensor 110, the reading transistor 108 and/or the driving transistor 106. In some embodiments, the direction DZ may be a normal direction of the second substrate SUB2. The first light blocking layer LB1 may include a dark film which is organic or inorganic, such as an organic pigment layer or a metal layer, for example, a black matrix (BM) layer. In the direction DZ, the first light blocking layer LB1 blocks the elements of the sensing element SSE, and it is not easy to find the sensing element SSE from the viewing side 200, and also the reflected light on the surface of the display surface 100d is reduced, such that the electronic device 100 may have better visual effects on the display surface 100d. On the other hand, the material of the first light blocking layer LB1 may block more than 70% amount of visible light, and the total amount of ambient light entering the sensor 110 may be reduced, thereby reducing the generated background noise, improving the signal to noise ratio (S/N ratio) and/or improving the sensing accuracy. In some embodiments, the electronic device 100 may further include a second light blocking layer LB2 disposed between the sensor unit SSU and the display media layer DML. In some embodiments, the second light blocking layer LB2 is disposed between the sensor unit SSU and the display unit DPU. In some embodiments, the second light blocking layer LB2 may surround the periphery of the sensor, for example, covering a sidewall, a bottom surface and/or the bias line 132 of the sensor 110. The second light blocking layer LB2 may reduce the noise caused by the direct or scattered light entering the sensor 110 from the lateral side or the back side (e.g., the light emitted from the backlight module BLU or the light reflected from nearby sub-pixels), and the sensing accuracy may be improved. The material of the second light blocking layer LB2 may be the same as or different from the material of the first light blocking layer LB1, not redundantly described herein. The lower surface SUB21 of the second substrate SUB2 may be selectively disposed with an insulating layer 120, a buffer layer 122, an insulating layer 126, a protective layer 128 and a planarization layer 130. The insulating layer 120 and the planarization layer 130 may include overcoating layer materials, for example, including organic materials. The planarization layer 130 covers the lower surface SUB21 of the second substrate SUB2, that is, covering the sensor 110 and the second light blocking layer LB2. The protective layer 128 may be used as a passivation layer. Each of the above layers may respectively include an organic or inorganic insulating material, such as an oxide layer or a nitride layer, but not limited thereto. The sensor unit SSU may be used to perform fingerprint recognition. When the user's finger touches or approaches the display surface 100d, light may be reflected by the finger. After the reflected light enters the sensor 110, photoelectric signals may be generated, and fingerprint recognition data may be obtained after processing and analyzing the fingerprint recognition data by the processing unit. It should be noted that, although the present disclosure takes fingerprint recognition as an example, the function of the sensor unit SSU is not limited to the fingerprint recognition.

A light converting layer may be disposed on the surface SUB21 of the second substrate SUB2, and the light converting layer may include a plurality of light converting elements 104 disposed in the openings of the patterned first light blocking layer LB1. When the electronic device 100 includes a liquid crystal display panel, the light converting elements 104 may be respectively a color light filtering layer. In FIG. 3, the symbols "R", "G" and "B" respectively represent a red light filtering layer, a green light filtering layer and a blue light filtering layer. The red light filtering layer, the green light filtering layer and the blue light filtering layer are adjacently and alternately disposed in a sequence and respectively correspond to a sub-pixel 102, and three of the sub-pixels 102 may be a group to form a pixel. However, the colors of the color light filtering layers are not limited to those described above. In addition, the number of the sub-pixels that forms the pixel is not limited to three, and the arrangement of the sub-pixels 102 is not limited to that shown in FIG. 3. Furthermore, although FIG. 3 shows that a sensing element SSE may be disposed beside a pixel, the number of pixels corresponding to one sensing element SSE is not limited in the present disclosure. In other words, in some embodiments, it may be designed that not each pixel is arranged with a sensing element SSE.

The electronic device of the present disclosure is not limited by the aforementioned embodiments. Other different embodiments or variant embodiments of the present disclosure will be disclosed in the following description. However, for simplifying the description and clearly showing the difference between various embodiments or variant embodiments, the identical components in the following description are marked with identical symbols, and the repeated parts will not be redundantly described. In addition, the material and thickness of each film or layer and conditions of related fabrication process in the following embodiments of the present disclosure may refer to the first embodiment, which will not be redundantly described.

Figure 5:
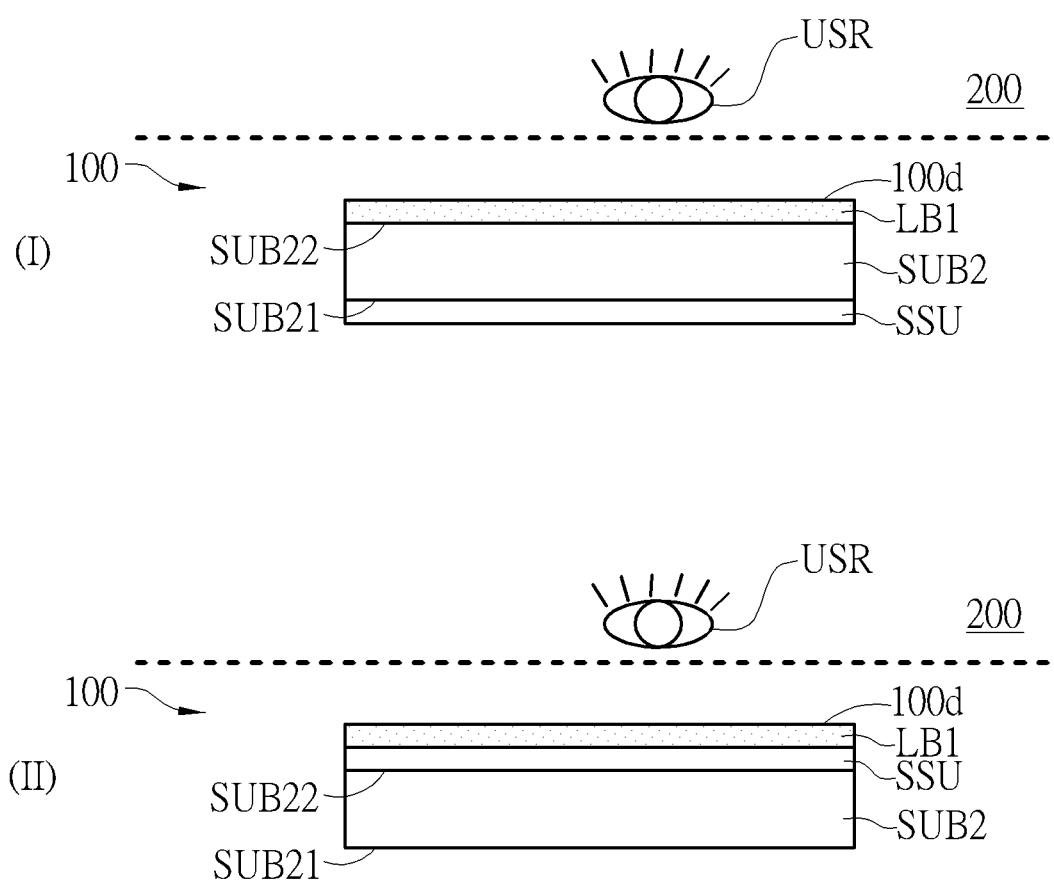
FIG. 5 is an enlarged partial cross-sectional view of a second embodiment and a variant embodiment of an electronic device according to the present disclosure.

Please refer to FIG. 5. FIG. 5 is an enlarged partial cross-sectional view of a second embodiment and a variant embodiment of an electronic device according to the present disclosure. FIG. 5 mainly illustrates the arrangement of the second substrate SUB2, the first light blocking layer LB1 and the sensor unit SSU, and most of the other layers are omitted, wherein the arrangement of the other layers may refer to FIG. 4. The following FIG. 6 to FIG. 9 have similar omission, not redundantly described hereinafter. The example (I) of FIG. 5 illustrates that a first light blocking layer LB1 may be disposed on the upper surface SUB22 of the second substrate SUB2, and the sensor unit SSU may be disposed on the lower surface SUB21 of the second substrate SUB2. In other words, the second substrate SUB2 is disposed between the sensor unit SSU and the first light blocking layer LB1, that is, the first light blocking layer LB1 is disposed between the second substrate SUB2 and the viewing side 200, and the sensor unit SSU is disposed between the viewing side 200 and the second substrate SUB2. The example (II) of FIG. 5 illustrates that the first light blocking layer LB1 and the sensor unit SSU are both disposed on the upper surface SUB22 of the second substrate SUB2, and the sensor unit SSU is between the first light blocking layer LB1 and the second substrate SUB2. In the embodiments shown in FIG. 5, the first light blocking layer LB1 is between the sensor unit SSU and the viewing side 200, that is, the first light blocking layer LB1 is between the sensor unit SSU and the user USR, and the first light blocking layer LB1 is closer to the display surface 100d of the electronic device 100 than the sensor unit SSU. The design described above may reduce most background ambient light to enter the sensor unit SSU from the viewing side 200 for increasing the signal to noise ratio of the sensor unit SSU when sensing. The relative arrangement of the sensor unit SSU and the first light blocking layer LB1 may be applied in various embodiments of the present disclosure, and will not be described in the following.

Figure 6:
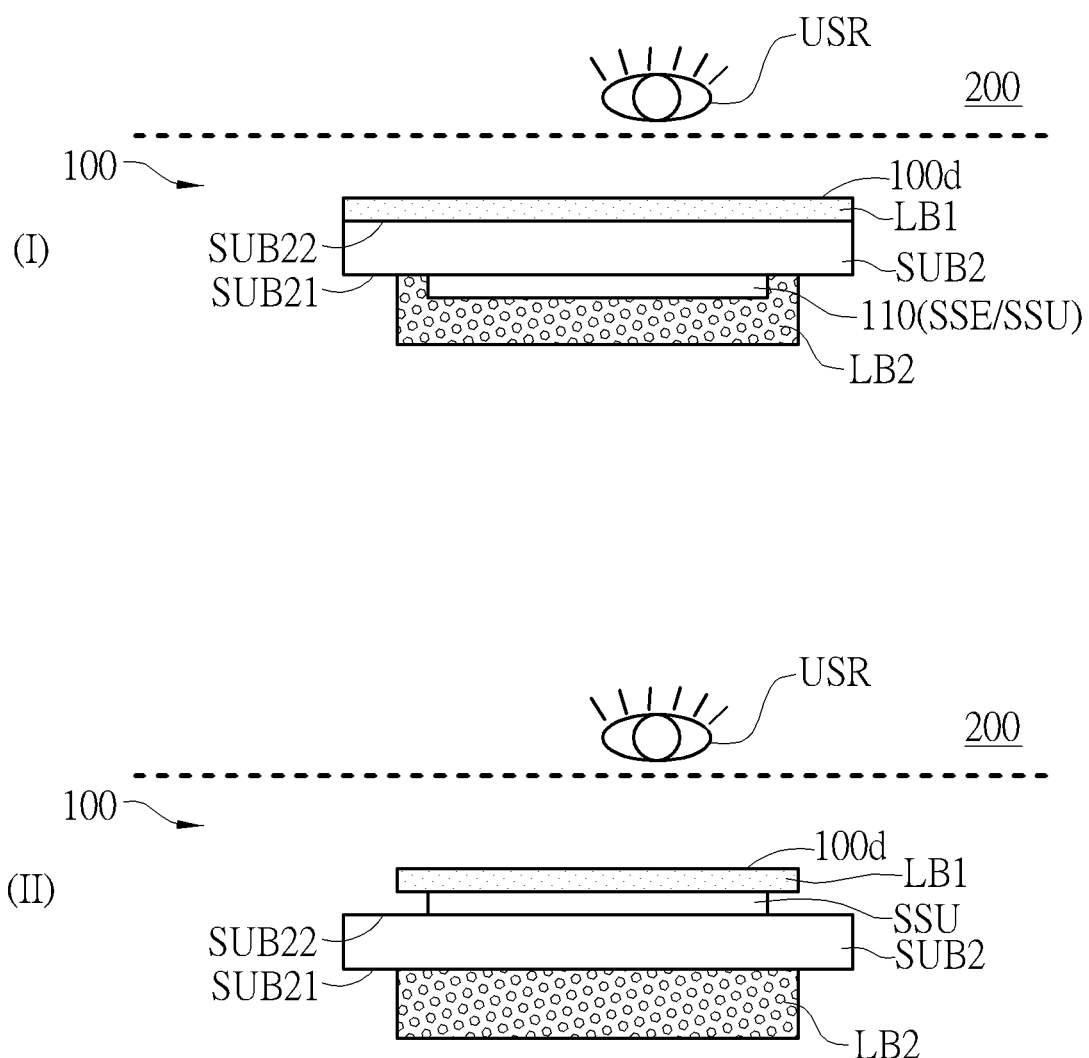
FIG. 6 is an enlarged partial cross-sectional view of a third embodiment and a variant embodiment of an electronic device according to the present disclosure.

In the embodiments illustrated in FIG. 5, the second light blocking layer LB2 is not illustrated, but the second light blocking layer LB2 may be disposed corresponding to the sensor unit SSU in some embodiments, for example, disposed on the back side of the sensor unit, as shown in FIG. 6.

Please refer to FIG. 6. FIG. 6 is an enlarged partial cross-sectional view of a third embodiment and a variant embodiment of an electronic device according to the present disclosure. FIG. 6 mainly illustrates the arrangement of the second substrate SUB2, the first light blocking layer LB1, the second light blocking layer LB2 and the sensor unit SSU, and most of the other layers are omitted. The example (I) of FIG. 6 illustrates that the second substrate SUB2 is between the first blocking layer LB1 and the sensor unit SSU, and the sensor unit SSU may be surrounded by the second light blocking layer LB2. For example, the back side and the lateral side of the sensor 110 in the sensing element SSE of the sensor unit SSU may be surrounded by the second light blocking layer LB2, but not limited thereto. The example (II) of FIG. 6 illustrates that the sensor unit SSU is between the first light blocking layer LB1 and the second substrate SUB2, and the second light blocking layer LB2 and the sensor unit SSU are at different sides of the second substrate SUB2. Viewing form the back side, the second light blocking layer LB2 at least partially blocks the back side of the sensor 110. For example, the sensor 110 may have a smaller size or width than the corresponding second light blocking layer LB2 to reduce the proportion of light entering the sensor 110 from the back side of the sensor 110. It should be noted that, in this embodiment, the arrangement of the first light blocking layer LB1, the second light blocking layer LB2 and the sensor unit SSU are not limited in the way shown in FIG. 6. In addition, in some embodiments, the second light blocking layer LB2 may be a light blocking layer corresponding to a plurality of sensors 110 after being patterned. In other embodiments, the second light blocking layer LB2 may be a large-area film covering most of the surface of the second substrate SUB2.

Figure 7:
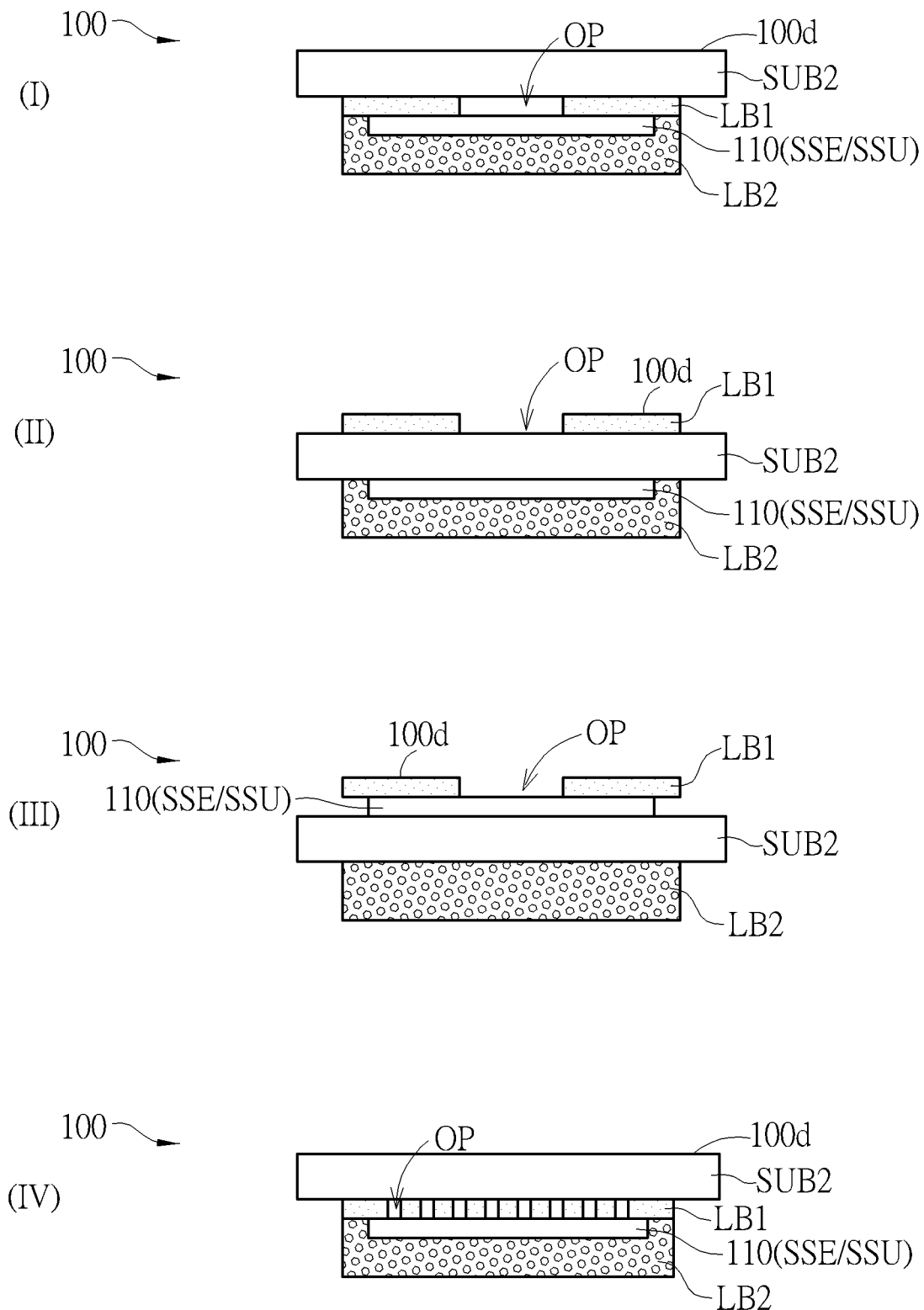
FIG. 7 is an enlarged partial cross-sectional view enlargement schematic diagram of a fourth embodiment and variant embodiments of an electronic device according to the present disclosure.

Please refer to FIG. 7. FIG. 7 is an enlarged partial cross-sectional view enlargement schematic diagram of a fourth embodiment and variant embodiments of an electronic device according to the present disclosure. FIG. 7 mainly illustrates the arrangement of the first light blocking layer LB1, the second light blocking layer LB2 and the sensor unit SSU on the surface of the second substrate SUB2, and most of the other layers are omitted. In the example (I) of FIG. 7, the first light blocking layer LB1 is on the lower surface of the second substrate SUB2, that is, located between the sensor 110 and the second substrate SUB2. The first light blocking layer LB1 further includes an opening OP exposing part of the sensor 110. In other words, in a top view direction of the electronic device 100, the opening OP overlaps at least one portion of the sensor unit SSU. The size (or the width) of the opening OP shown in FIG. 7 may be smaller than the size (or the width) of the sensor 110, but not limited thereto. The opening OP may be designed in different shapes or sizes as required. When performing fingerprint recognition, the light reflected by a finger from one side of the display surface 100d may enter the sensor 110 through the opening OP, thereby increasing the total amount of the reflected light entering the sensor 110. In addition, the example (I) illustrates that the second light blocking layer LB2 covers the lower surface and the sidewall of the sensor 110. In the example (II), the substrate SUB2 is between the first light blocking layer LB1 and the sensor unit SSU, and the first light blocking layer LB1 includes an opening OP. In the example (III), the sensor 110 is between the first light blocking layer LB1 and the second substrate SUB2, and the first light blocking layer LB1 includes an opening OP. In the example (IV), the relative positions of the first light blocking layer LB1 and the sensor 100 are similar to the example (I), but the first light blocking layer LB1 includes a plurality of smaller openings OP adjacently arranged. This design benefits enhancing the collimation of the incident light, that is, it is more likely to limit the light entering the sensor 110 to the light incident in a normal direction, and the large angle incident light may be filtered. Disposing the opening OP in the first light blocking layer LB1 may enable the sensor 110 to receive more light reflected from the fingers, and the signal intensity is increased, and in combination with the first light blocking layer LB1 which may block most of the ambient light, thus improving the signal to noise ratio.

Figure 8:
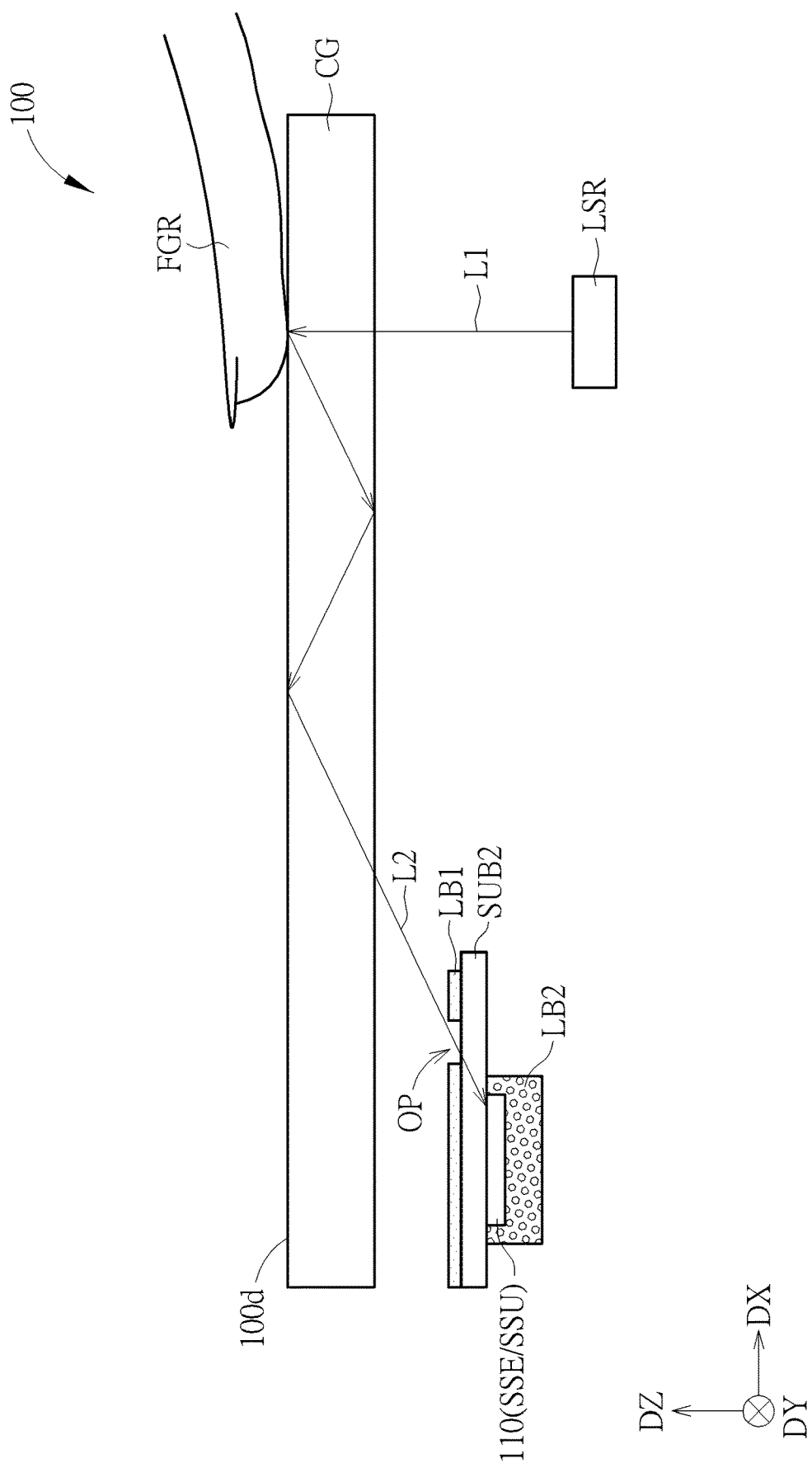
FIG. 8 is an enlarged partial cross-sectional view of a fifth embodiment of an electronic device according to the present disclosure.

Please refer to FIG. 8. FIG. 8 is an enlarged partial cross-sectional view of a fifth embodiment of an electronic device according to the present disclosure. The electronic device 100 shown in FIG. 8 further includes a cover CG disposed above the second substrate SUB2, and the cover CG may be a transparent glass substrate or a transparent soft substrate for example, but not limited thereto. When performing finger recognition, the finger may touch the upper surface of the cover CG for recognizing. In the direction DZ, the opening OP of the first light blocking layer LB1 may not overlap the sensor 110 and may be located at the adjacent side of the sensor 110. When the finger FGR approaches the cover CG, the light L1 emitted from a light source LSR of a light emitting unit may enter the cover CG and be reflected by the finger FGR near the upper surface of the cover CG, and the cover CG may be used as a light guiding plate, and the reflected light L2 may travel laterally (e.g., being totally reflected) in the cover CG to the far side before exiting the cover CG and enter the sensor 110 through the opening OP. For example, the light source LSR may be disposed on the first substrate (not shown) or the second substrate SUB2, e.g., disposed near the outer edge of the first substrate, but not limited thereto. In some embodiments, the light source LSR may be an additional element independently disposed outside the substrate.

Figure 9:
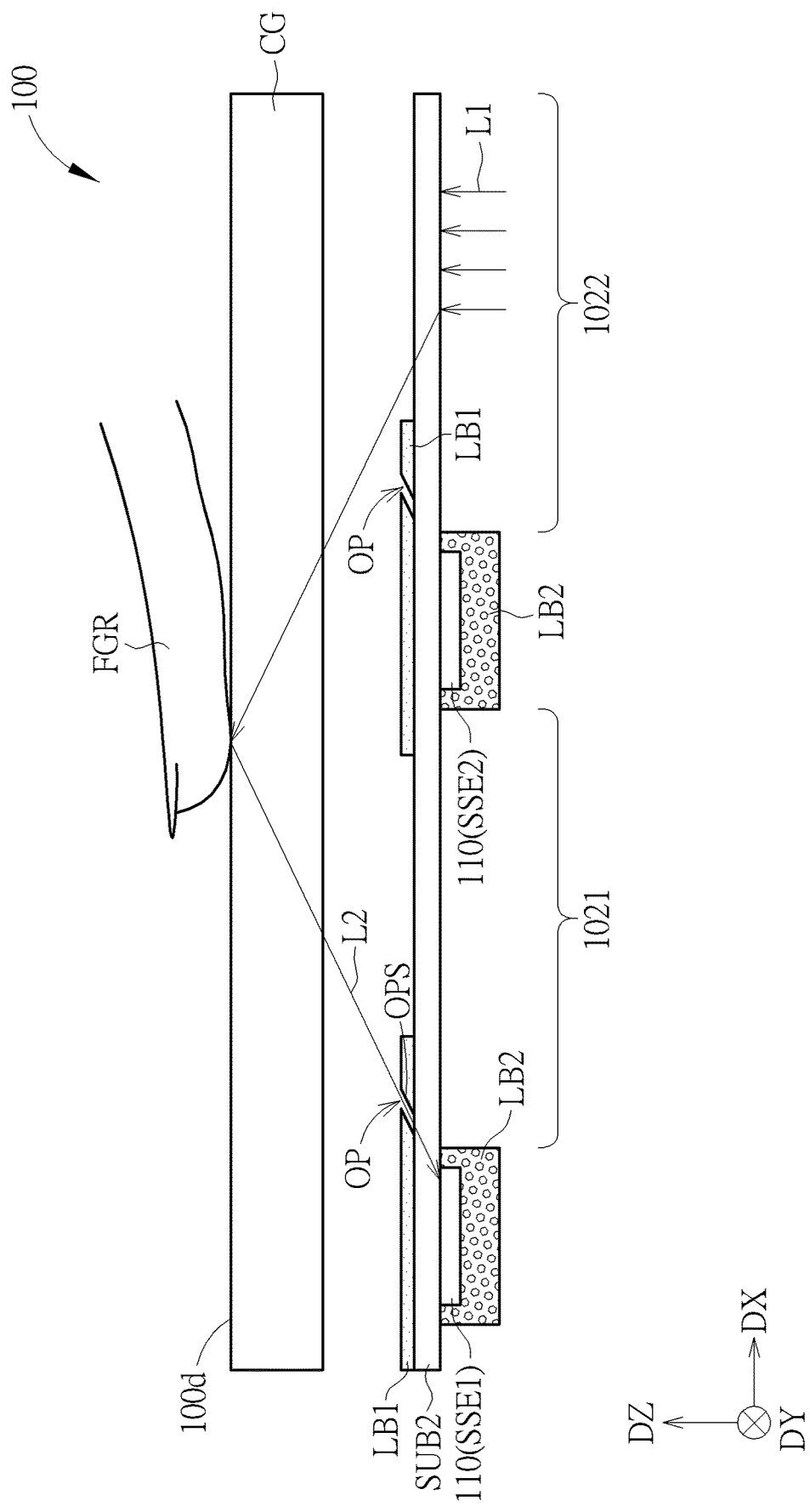
FIG. 9 is an enlarged partial cross-sectional view of a variant embodiment of the fifth embodiment of an electronic device according to the present disclosure.

Please refer to FIG. 9. FIG. 9 is an enlarged partial cross-sectional view of a variant embodiment of the fifth embodiment of an electronic device according to the present disclosure. In the electronic device 100 shown in FIG. 9, the sensing element SSE1 corresponds to its adjacent pixel 1021, the sensing element SSE2 corresponds to it adjacent pixel 1022, and the opening OP of the first light blocking layer LB1 has an inclined sidewall OPS. When the electronic device 100 performs fingerprint recognition, one sensor 110 may receive the reflected light of the light emitted from the pixel that does not correspond to the sensor 110 itself. For example, the pixel 1022 is not adjacent to the sensing element SSE1 and does not correspond to the sensing element SSE1, but the light L1 emitted from the pixel 1022 may be reflected by the finger FGR to form the light L2, entering the sensor 110 of the sensing element SSE1 that is farther from the pixel 1022, and perform fingerprint sensing and recognition. In FIG. 9, the opening OP having the inclined sidewall OPS may be designed to receive the reflected light of the pixel 1022 which is apart for the sensor 110 of the sensing element SSE1 in a specific distance, but the present disclosure is not limited thereto. The sensor 110 may receive the reflected light L2 of the light L1 emitted from the pixel with a longer distance, for example, may receive the reflected light L2 of the light L1 emitted from the pixel that are two pixels apart or more than two pixels apart.

Figure 10:
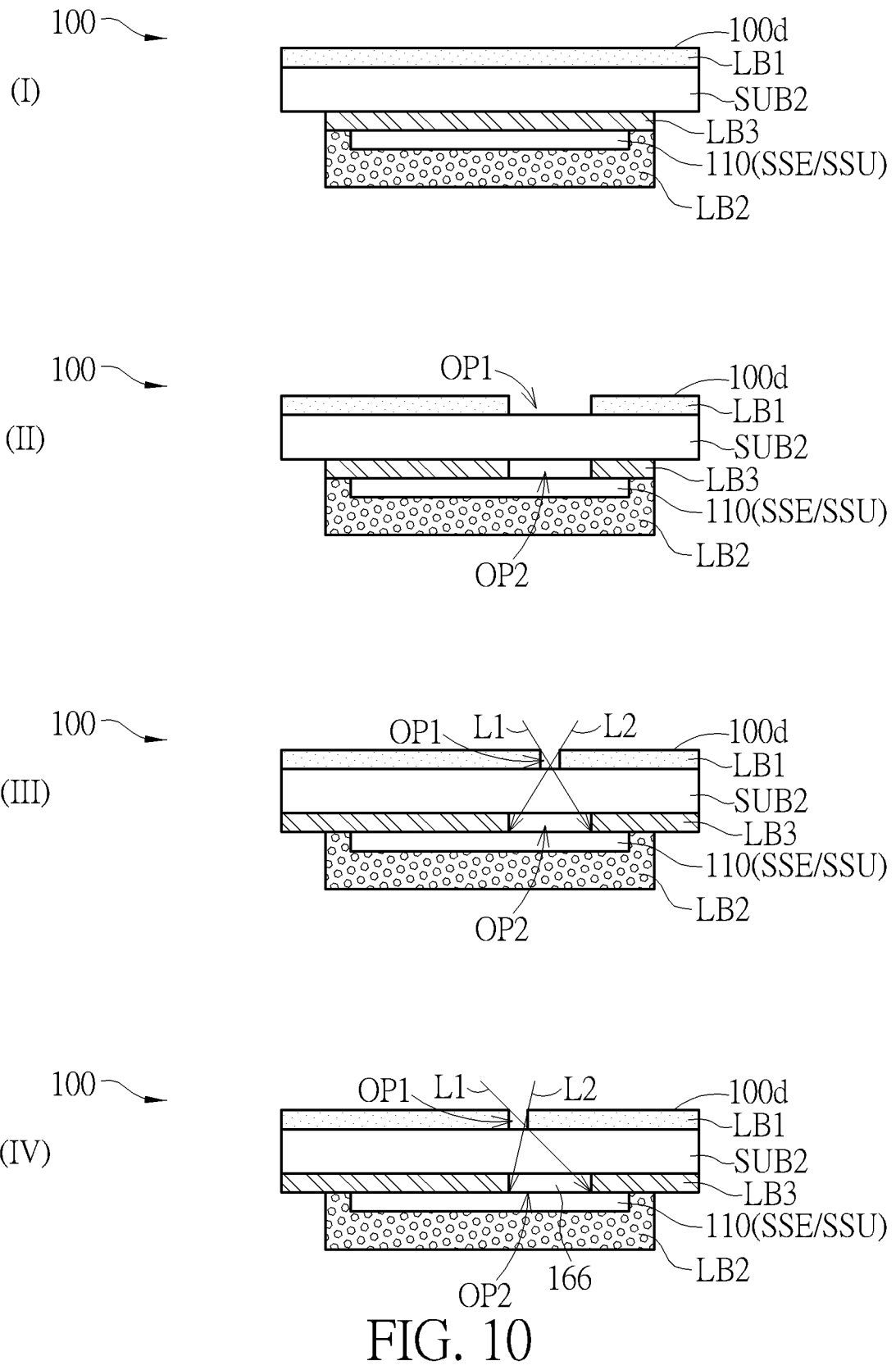
FIG. 10 is an enlarged partial cross-sectional view of a sixth embodiment and variant embodiments of an electronic device according to the present disclosure.

Please refer to FIG. 10. FIG. 10 is an enlarged partial cross-sectional view of a sixth embodiment and variant embodiments of an electronic device according to the present disclosure. The electronic device 100 shown in FIG. 10 may further include a third light blocking layer LB3. As shown in the example (I), the first light blocking layer LB1 is disposed on the upper surface of the second substrate SUB2, the second light blocking layer LB2 is disposed on the lower side of the sensor 110, and the third light blocking layer LB3 is disposed between the second substrate SUB2 and the sensor unit 110. In the example (II), the first light blocking layer LB1 has an opening OP1, and the third light blocking layer LB3 has an opening OP2. The opening OP1 and the opening OP2 may have approximately identical size and correspond to each other up and down, and for example, the sidewalls of the opening OP1 and the opening OP2 are substantially aligned with each other, but not limited thereto. The incident angle limitation formed by the opening OP1 and the opening OP2 may filter the incident light or increase the signal to noise ratio. In the example (III), the size or width of the opening OP1 is smaller than the size or width of the opening OP2, and the opening OP1 substantially corresponds to the central region of the opening OP2. In this design, the light L1 and the light L2 may pass through the opening OP1, the second substrate SUB2, and the opening OP2 in sequence with a larger incident angle and then enter the sensor 110. In the example (IV), a sidewall of the opening OP1 may be substantially aligned with a sidewall of the opening OP2, and this design enables the light L1 entering the sensor 110 and the light L2 entering the sensor 110 to have different angles. The opening sizes and relative positions of the opening OP1 and the opening OP2 described above may be determined according to the actual requirements of the products. The material of the third light blocking layer LB3 may be the same as or different from the first light blocking layer LB1 and the second light blocking layer LB2, and the size and width of the third light blocking layer LB3 are not limited to those shown in FIG. 10, which may be changed according to actual requirements. It should be noted that, the example (III) and the example (IV) of FIG. 10 have different light incident angles, which may respectively correspond to the condition when the large angle light (e.g., when the light source is a distant pixel or a distant light source LSR) is detected or the condition when the small angle light (e.g., when the light source is a near pixel) is detected.

Figure 11:
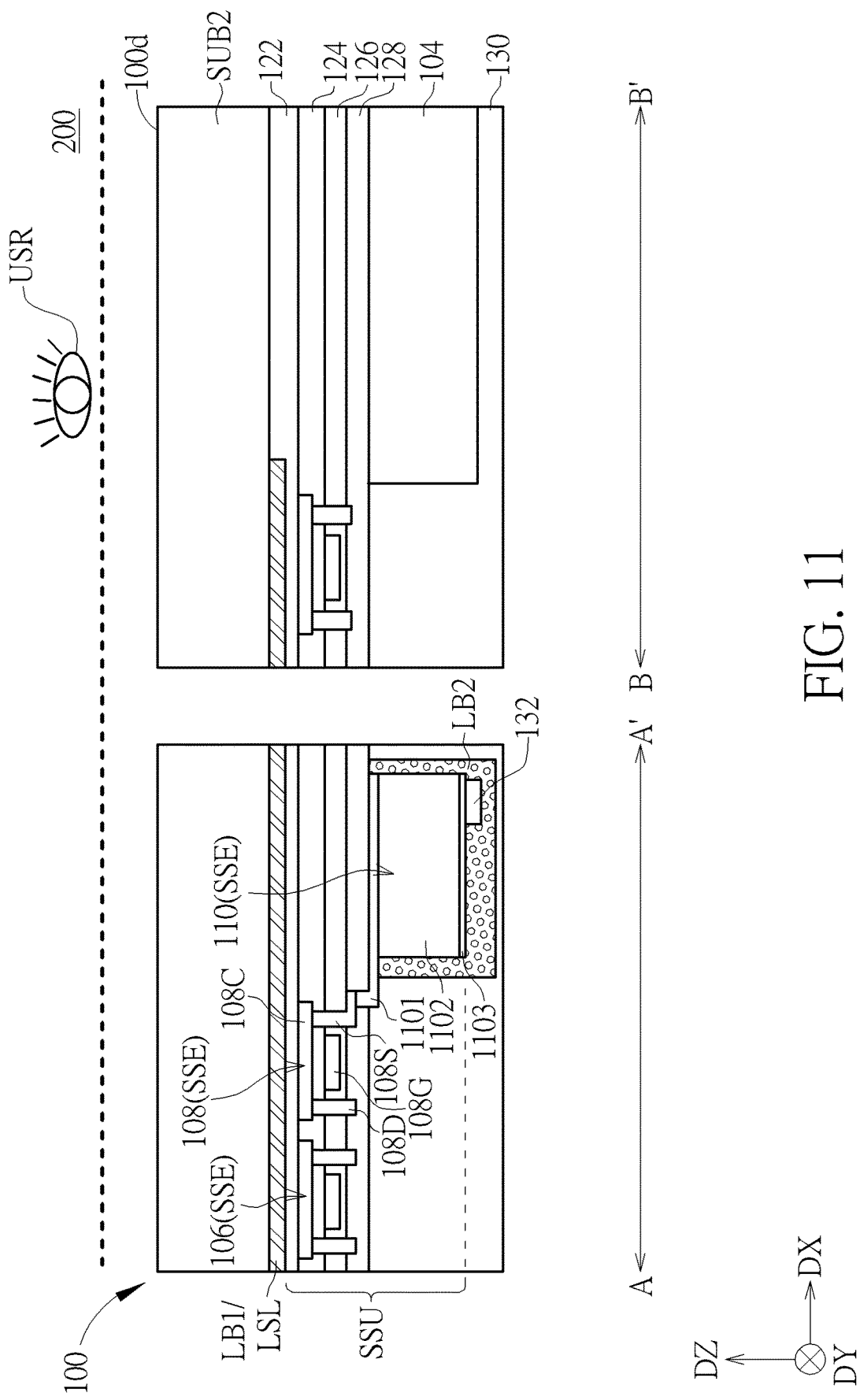
FIG. 11 is an enlarged partial cross-sectional view of a seventh embodiment of an electronic device according to the present disclosure.

Please refer to FIG. 11. FIG. 11 is an enlarged partial cross-sectional view of a seventh embodiment of an electronic device according to the present disclosure, and the cross-sectional views illustrated in FIG. 11 may substantially correspond to the line segment A-A' and the line segment B-B' of FIG. 3. In some embodiments, a light shielding layer LSL may be disposed above the driving transistor 106 and the reading transistor 108, and the light shielding layer LSL may include low light transmittance materials, for example, including metals, but not limited thereto. The light shielding layer LSL may be used as the first light blocking layer LB1 mentioned in the above-described present disclosure, and the black matrix layer (which is used as the first blocking layer LB1 in the above-described embodiments) may be replaced by the light shielding layer LSL. In addition, compared with the above-described embodiments, the electronic device shown in FIG. 11 also omits the insulating layer 120 that may be used as an overcoating layer. Furthermore, in FIG. 11, the light converting element 104 is between the protective layer 128 and the planarization layer 130, and in the direction DZ, the heights of the places where the light converting element 104 and the sensor 110 are disposed are approximately the same. That is to say, the sensor 110 may be disposed between the protective layer 128 and the planarization layer 130, too.

Figure 12:
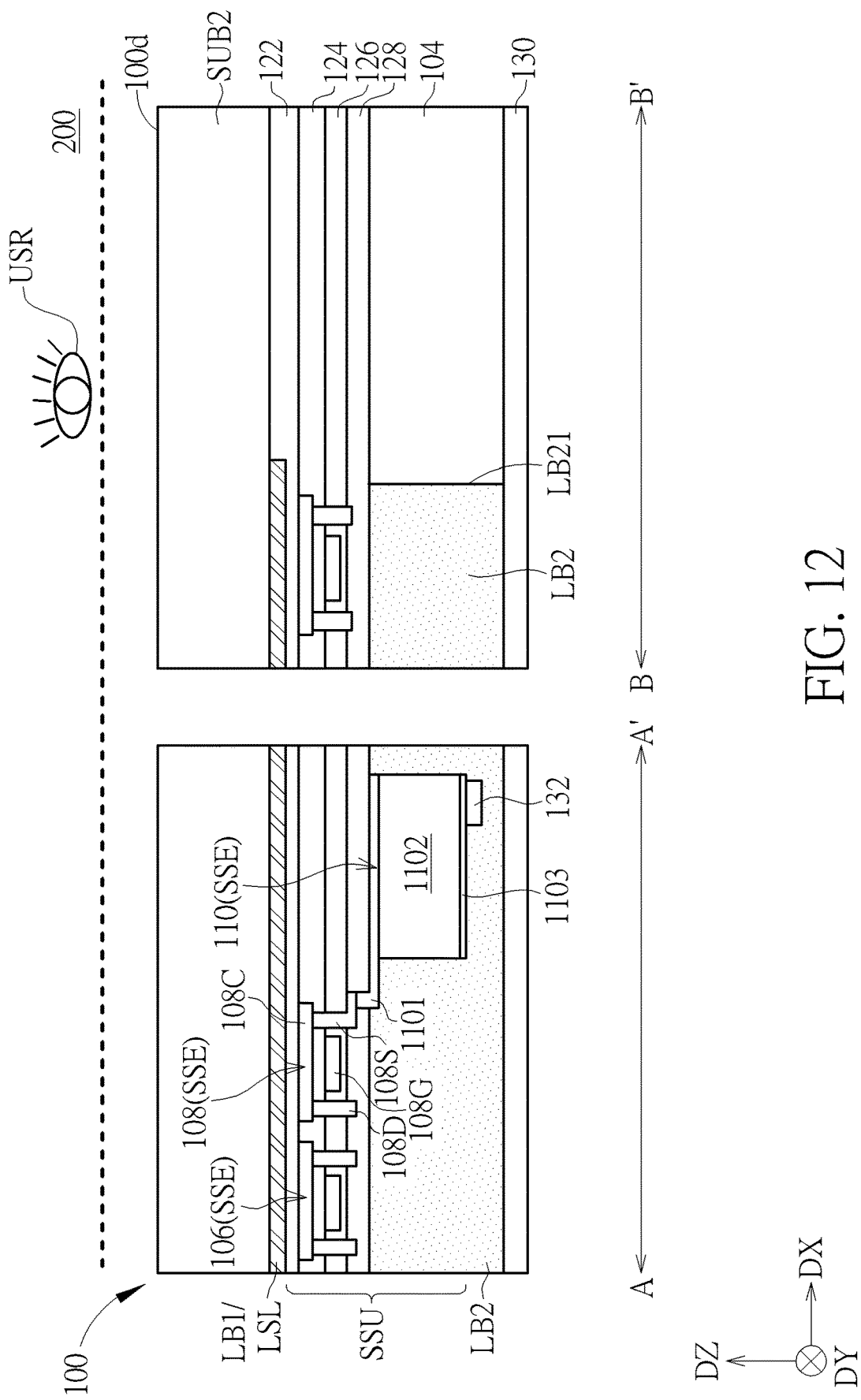
FIG. 12 is an enlarged partial cross-sectional view of a first variant embodiment of the seventh embodiment of an electronic device according to the present disclosure.

Please refer to FIG. 12. FIG. 12 is an enlarged partial cross-sectional view of a first variant embodiment of the seventh embodiment of an electronic device according to the present disclosure, and the cross-sectional views illustrated in FIG. 12 may substantially correspond to the line segment A-A' and the line segment B-B' of FIG. 3. The second light blocking layer LB2 of the electronic device 100 shown in FIG. 12 covers the lower surface of the second substrate SUB2 in a large area. The second light blocking layer LB2 has openings LB21, and the light converting elements 104 may be respectively disposed in one of the openings LB21. The second light blocking layer LB2 may include a black matrix layer, but not limited thereto.

Figure 13:
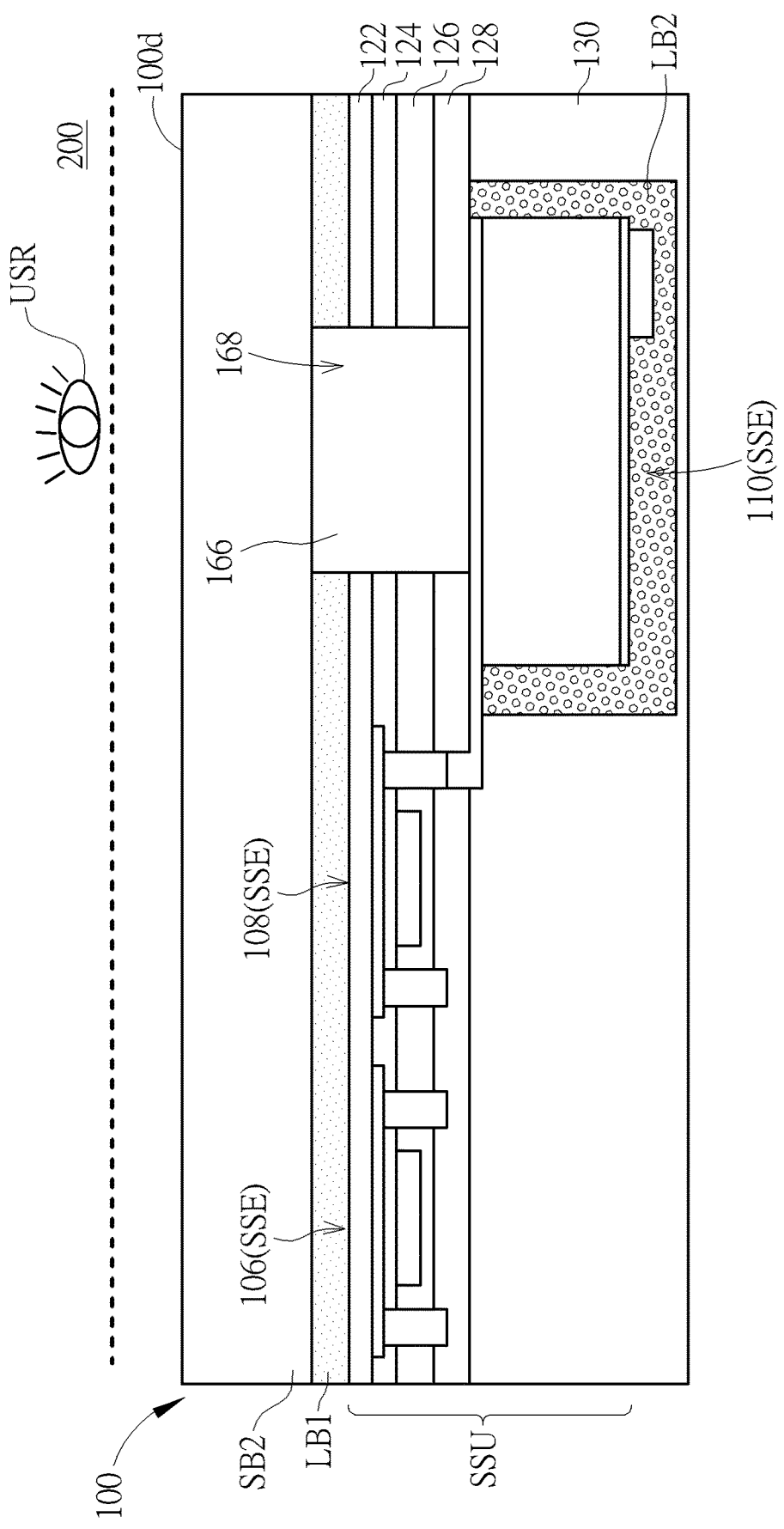
FIG. 13 is an enlarged partial cross-sectional view of a second variant embodiment of the seventh embodiment of an electronic device according to the present disclosure.

Please refer to FIG. 13. FIG. 13 is an enlarged partial cross-sectional view of a second variant embodiment of the seventh embodiment of an electronic device according to the present disclosure, and FIG. 13 only illustrates the cross-sectional view substantially corresponding to the line segment A-A' of FIG. 3. In FIG. 13, the insulating layer 122, the gate insulating layer 124, the insulating layer 126 and the protective layer 128 of the sensor unit SSU and the first light blocking layer LB1 have an opening 168, and the opening 168 may accommodate the refractive index adjusting material 166. For example, the refractive index n of the material is greater than the refractive index of the first light blocking layer LB1, and also may be greater than the insulating layer 122, the gate insulating layer 124, the insulating layer 126 and the protective layer 128, and the light is not easily to exit from the sidewall of the opening 168 after entering the opening 168, and the light may be reflected downward in the opening 168 to enter the sensor 110, and increase the light sensing efficiency. In another variant embodiment, the opening 168 and the refractive index adjusting material 166 may be only located in the first light blocking layer LB1, and the insulating layer 122, the gate insulating layer 124, the insulating layer 126 and the protective layer 128 do not have the opening 168.

Figure 14:
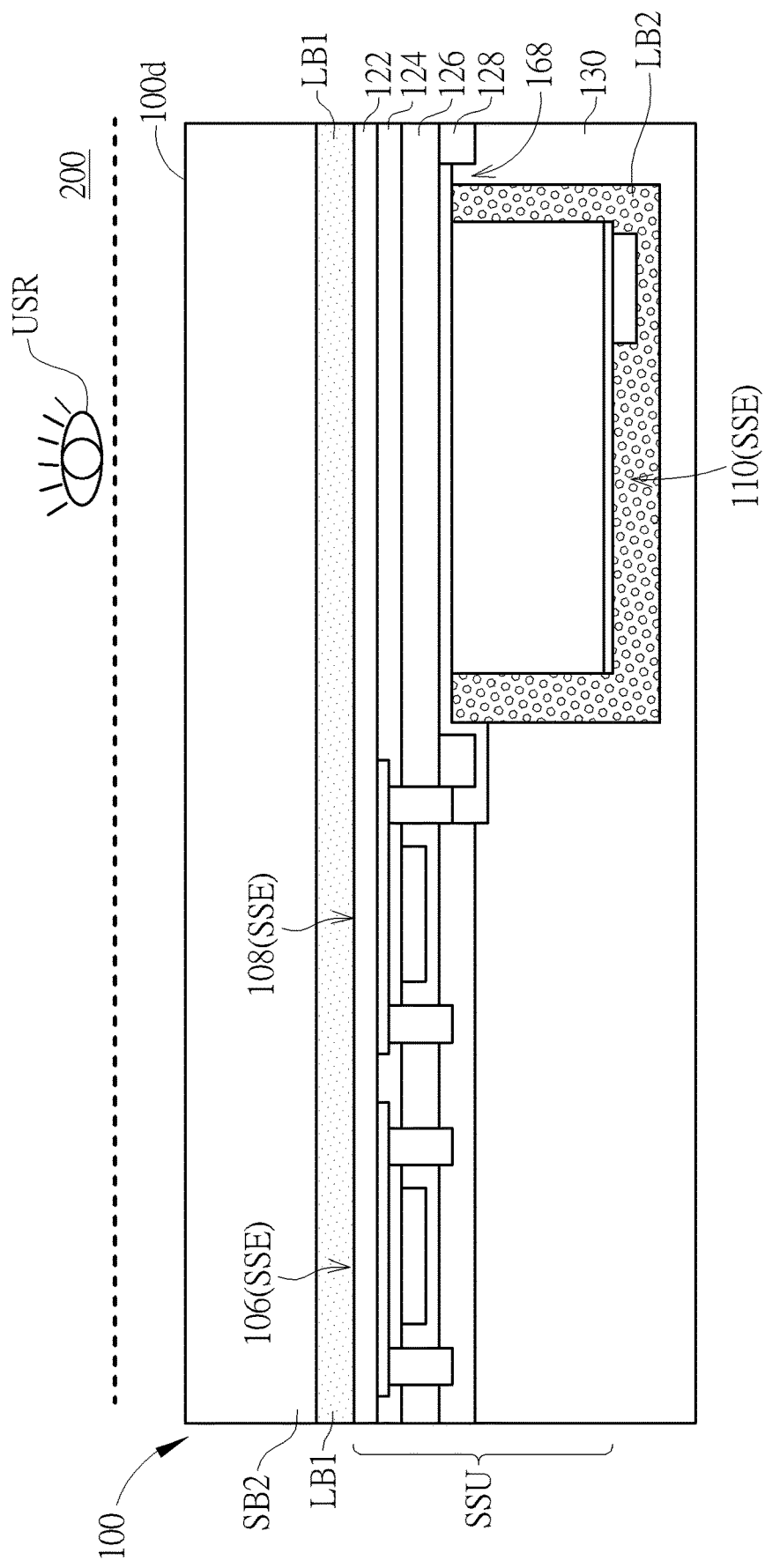
FIG. 14 is an enlarged partial cross-sectional view of a third variant embodiment of the seventh embodiment of an electronic device according to the present disclosure.
Figure 15:
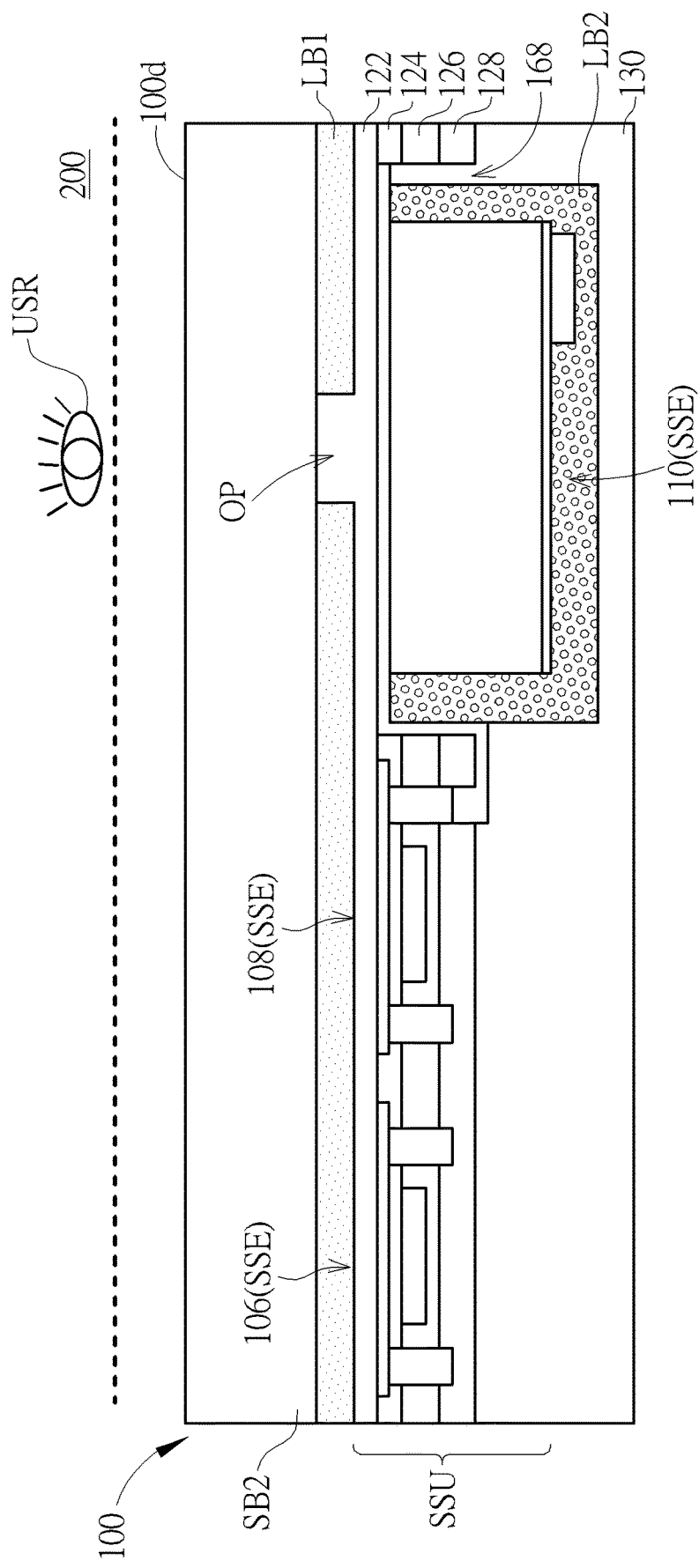
FIG. 15 is an enlarged partial cross-sectional view of a fourth variant embodiment of the seventh embodiment of an electronic device according to the present disclosure.
Figure 16:
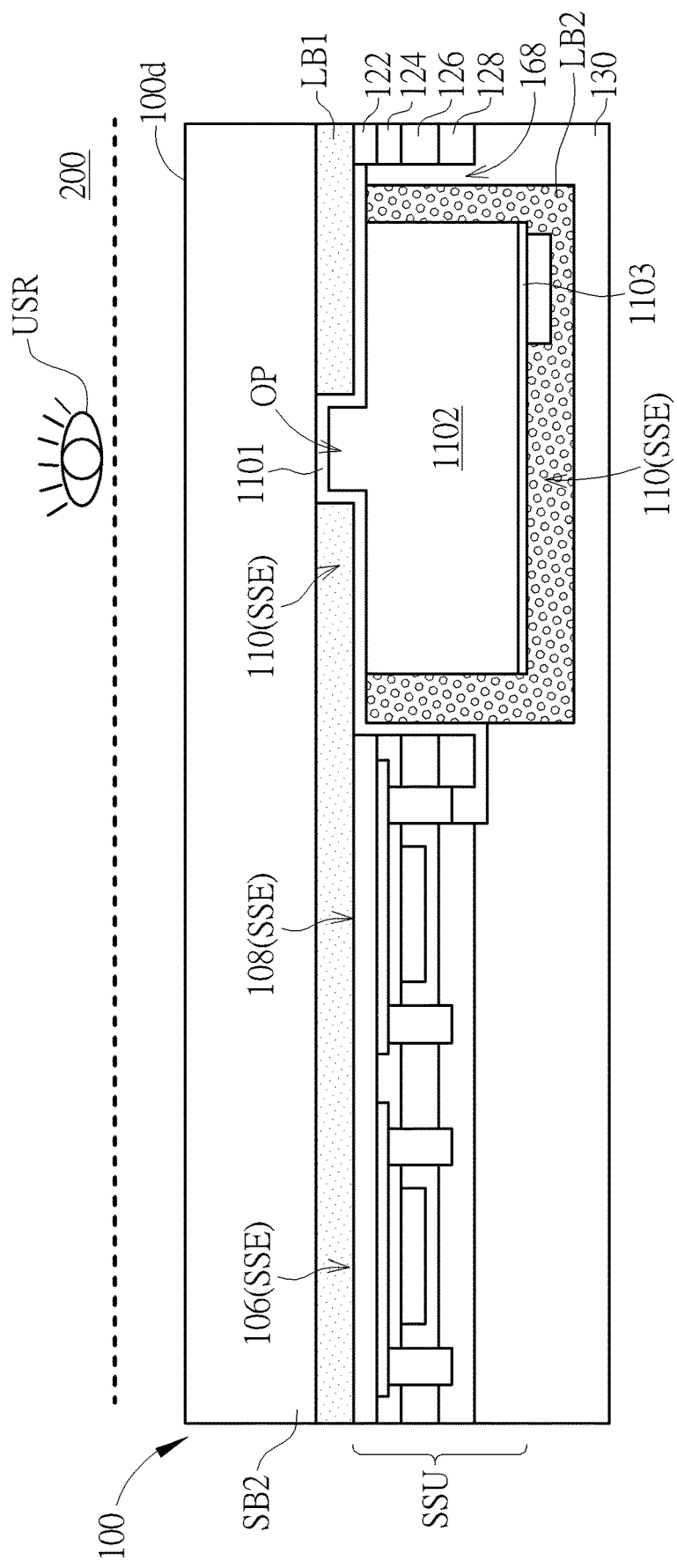
FIG. 16 is an enlarged partial cross-sectional view of a fifth variant embodiment of the seventh embodiment of an electronic device according to the present disclosure.

Please refer to FIG. 14, FIG. 15 and FIG. 16. FIG. 14 is an enlarged partial cross-sectional view of a third variant embodiment of the seventh embodiment of an electronic device according to the present disclosure. FIG. 15 is an enlarged partial cross-sectional view of a fourth variant embodiment of the seventh embodiment of an electronic device according to the present disclosure. FIG. 16 is an enlarged partial cross-sectional view of a fifth variant embodiment of the seventh embodiment of an electronic device according to the present disclosure. In the electronic device 100 shown in FIG. 14, the protective layer 128 has the opening 168, and a portion of the sensor 110 is disposed in the opening 168. In the electronic device 100 shown in FIG. 15, the gate insulating layer 124, the insulating layer 126 and the protective layer 128 has the opening 168, and a portion of the sensor 110 is disposed in the opening 168. Furthermore, in FIG. 15, the first light blocking layer includes the opening OP, and the insulating layer 122 is filled in the opening OP. In this design, the traveling path of the incident light may also be adjusted by using the difference in refractive indexes between the insulating layer 122 and the opening OP. In another variant embodiment, the first light blocking layer LB1 may not have the opening OP. In the electronic device 100 shown in FIG. 16, the insulating layer 122, the gate insulating layer 124, the insulating layer 126 and the protective layer 128 have the opening 168, and a portion of the sensor 110 and the second light blocking layer LB2 is disposed in the opening 168. Furthermore, the first light blocking layer LB1 has the opening OP, and a portion of the upper electrode 1101 of the sensor 110 is disposed in the opening OP.

Figure 17:
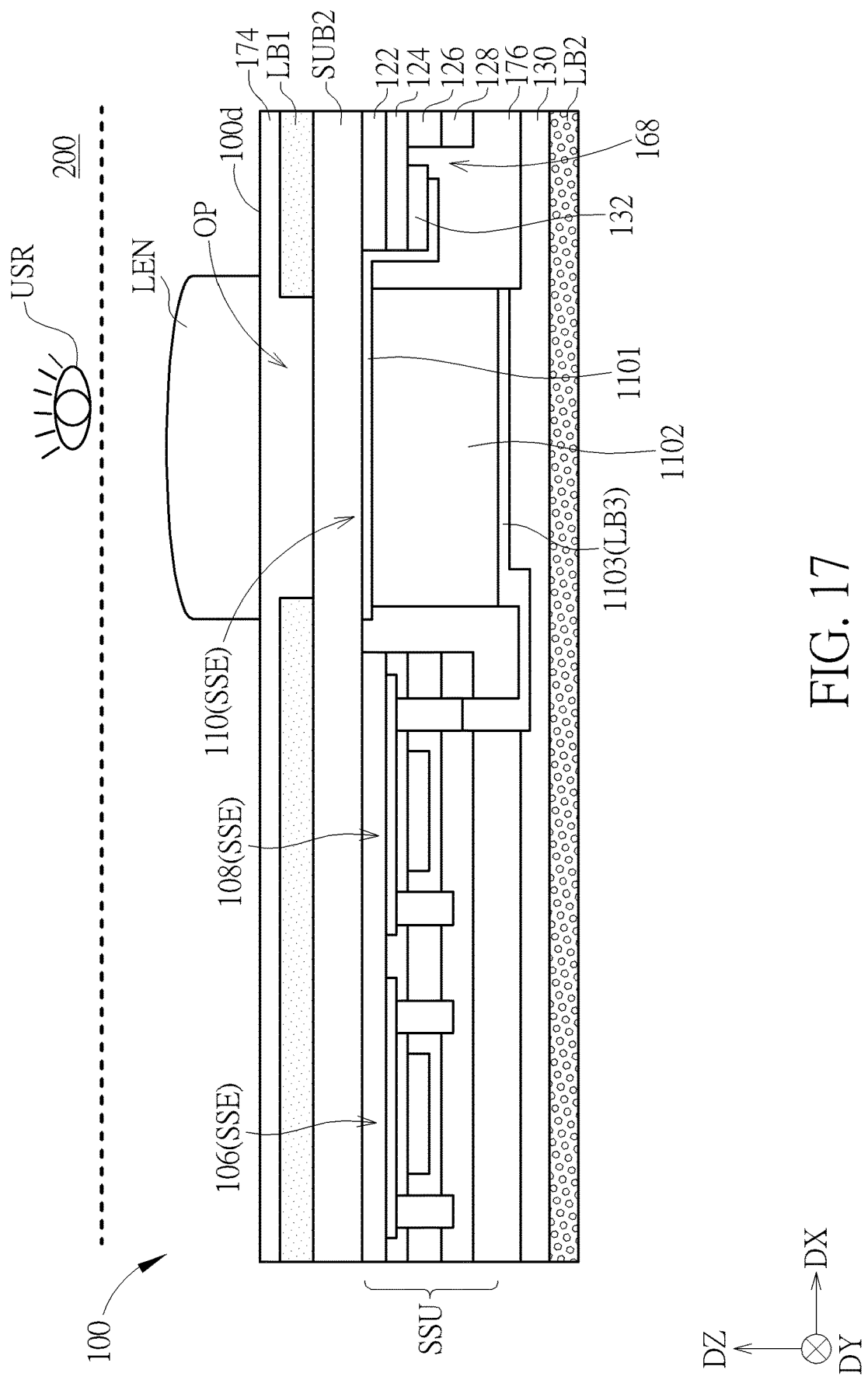
FIG. 17 is an enlarged partial cross-sectional view of an eighth embodiment of an electronic device according to the present disclosure.

Please refer to FIG. 17. FIG. 17 is an enlarged partial cross-sectional view of an eighth embodiment of an electronic device according to the present disclosure. In some embodiment, the electronic device 100 may further include one or more lenses LEN disposed on the upper side of the second substrate SUB2. As shown in FIG. 17, in the direction DZ, the first light blocking layer LB1 is disposed between the second substrate SUB2 and the lens LEN, and the first light blocking layer LB1 includes the opening OP substantially corresponding to the sensor 110 and the lens LEN. In detail, a plurality of lenses LEN may be included on the second substrate SUB2, and the plurality of lenses LEN respectively correspond to one sensor 110 and one opening OP of the first light blocking layer LB1. In addition, the lens LEN may be adhered to the surface of the first light blocking layer LB1 by using an adhesive layer 174. It should be noted that, in FIG. 17, the adhesive layer 174 also covers the region besides the opening OP, but this embodiment is not limited thereto. In some embodiments, the adhesive layer 174 is only located in the opening OP. On the other hand, the insulating layer 122, the gate insulating layer 124, the insulating layer 126 and the protective layer 128 shown in FIG. 17 include the opening 168. The sensor 110 is disposed in the opening 168, and the planarization layer 176 covers the protective layer 128 and is filled in the opening 168. It should be noted that, at the opening 168, the sidewall of the insulating layer 126 and the sidewall of the protective layer 128 may not be aligned with the sidewall of the insulating layer 122 and the sidewall of the gate insulating layer 124, and the bias line 132 and a portion of the upper electrode 1101 of the sensor 110 may be disposed at a position where the insulating layer 126 exposes the gate insulating layer 124. In FIG. 17, another planarization layer 130 may cover the surface of the planarization layer 176. The second light blocking layer LB2 may cover the surface of the planarization layer 130.

Figure 18:
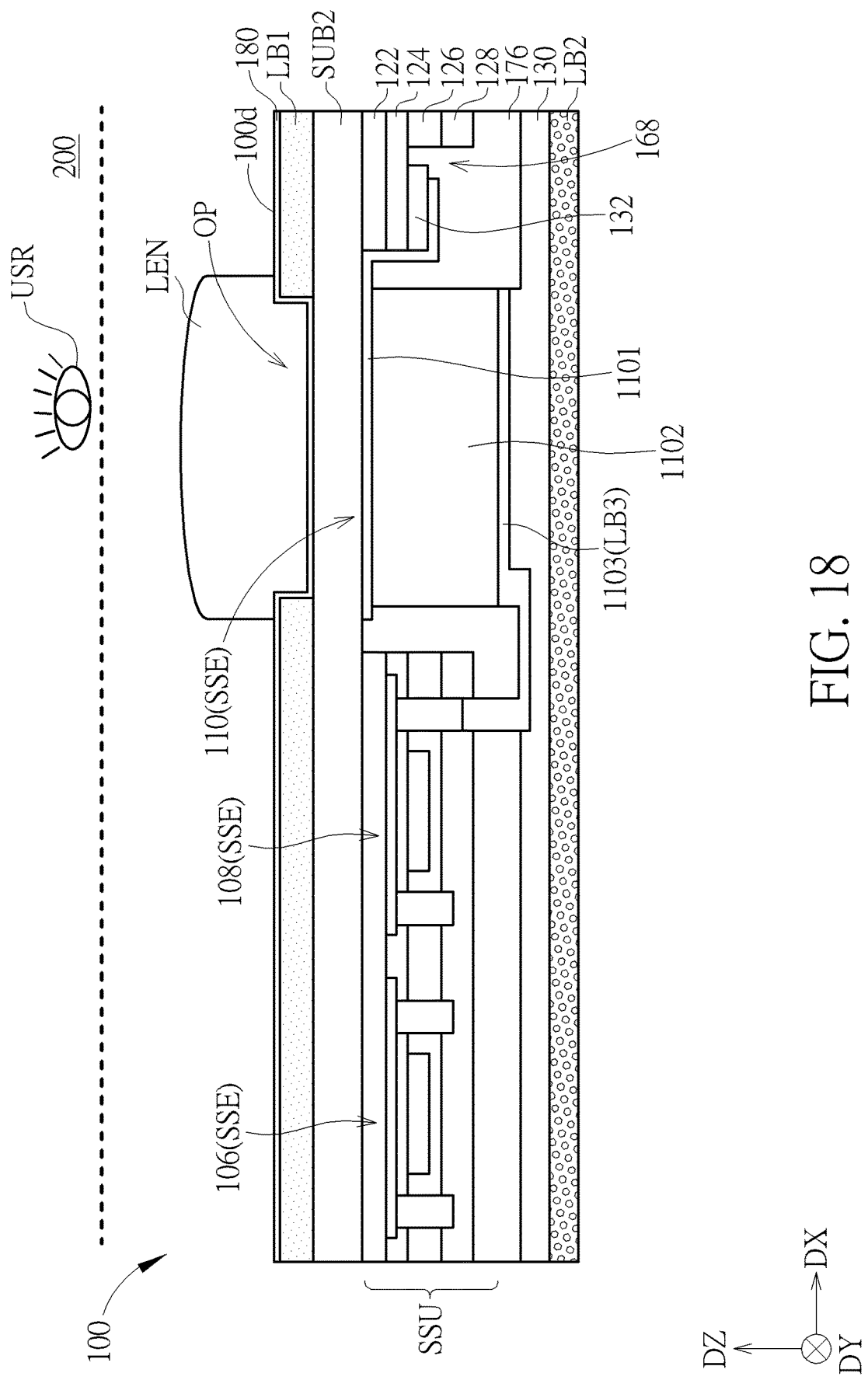
FIG. 18 is an enlarged partial cross-sectional view of a variant embodiment of the eighth embodiment of an electronic device according to the present disclosure.

Please refer to FIG. 18. FIG. 18 is an enlarged partial cross-sectional view of a variant embodiment of the eighth embodiment of an electronic device according to the present disclosure. In FIG. 18, an insulating layer 180 may be disposed between the lens LEN and the first light blocking layer LB1. The insulating layer 180, for example, includes (but is not limited to) the inorganic insulating materials, and a portion of the lens LEN and a portion of the insulating layer 180 may be both disposed in the opening OP of the light blocking layer LB1. In another variant embodiment (not shown), the first light blocking layer LB1 may be disposed on the lower side of the second substrate SUB and may have the opening OP, and the opening 168 exposes the opening OP. Furthermore, a portion of the sensor 110 is disposed in the opening OP and the opening 168.

Figure 19:
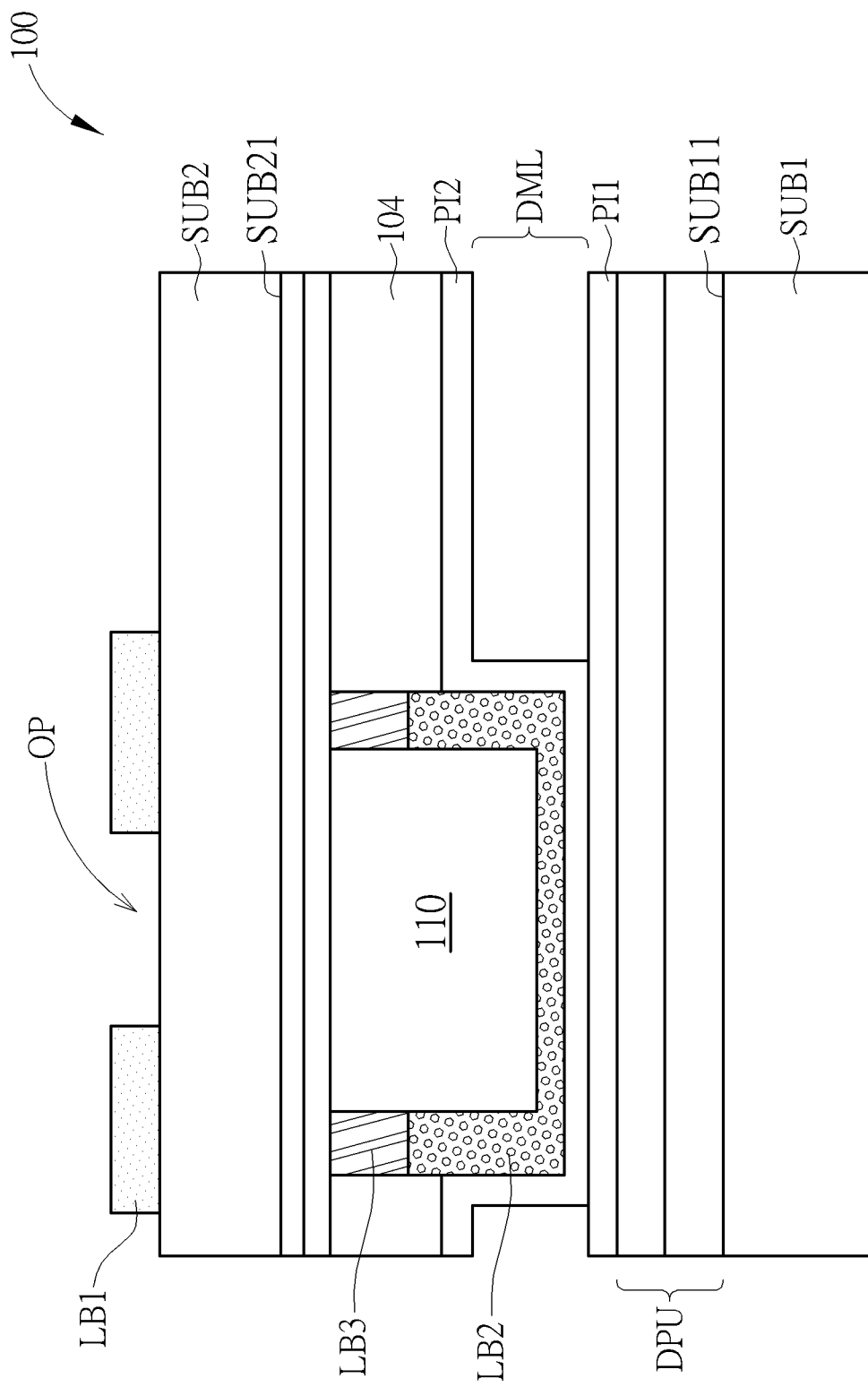
FIG. 19 is an enlarged partial cross-sectional view of a ninth embodiment of an electronic device according to the present disclosure.

Please refer to FIG. 19. FIG. 19 is an enlarged partial cross-sectional view of a ninth embodiment of an electronic device according to the present disclosure. In FIG. 19, the second light blocking layer LB2 is disposed on the bottom surface of the sensor 110 and the periphery of the bottom part of the sidewall of the sensor 110, and the third light blocking layer LB3 is disposed on the periphery of the top part of the sidewall of the sensor 110. The third light blocking layer LB3 and the second light blocking layer LB2 may include different materials. For example, the second light blocking layer LB2 may have a greater elastic coefficient or recovery property. A first alignment layer PI1 and a second alignment layer PI2 are disposed on two sides of the display media layer DML, the first alignment layer PI1 and the second alignment layer PI2 are respectively disposed adjacent to the upper surface SUB11 of the first substrate SUB1 and the lower surface SUB21 of the second substrate SUB2, among which the second alignment layer PI2 covers the second light blocking layer LB2 and the sensor 110. In the region having the sensor 110, the first alignment layer PI1 may contact the second alignment layer PI2. The sensor 110 and the second light blocking layer LB2 may be used as a spacer of the display media layer DML for partially replacing or totally replacing the photospacer, and to provide the function of maintaining the cell hap of the display media layer DML. When the second light blocking layer LB2 or the third light blocking layer LB3 has a good recovery property, better support function may be also provided when the second light blocking layer LB2 or the third light blocking layer LB3 is used as the spacer. In some variant embodiments, the combination of sensor 110 and the second light blocking layer LB2 still be used as the spacer of the display media layer DML, but the third light blocking layer LB3 is not included.

Figure 20:
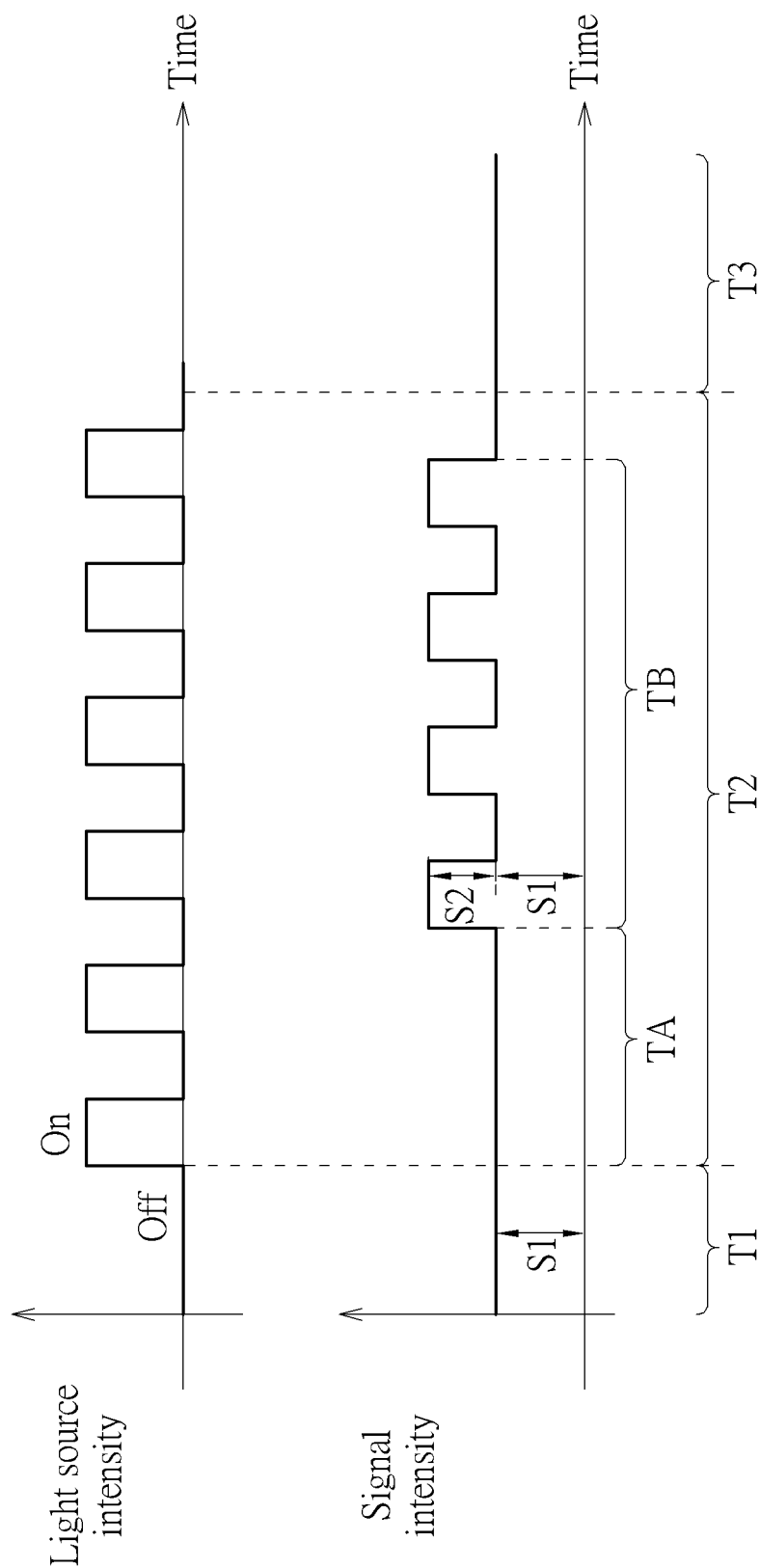
FIG. 20 is a schematic diagram of the signal according to an embodiment of a method of performing fingerprint recognition of an electronic device according to the present disclosure.
Figure 21:
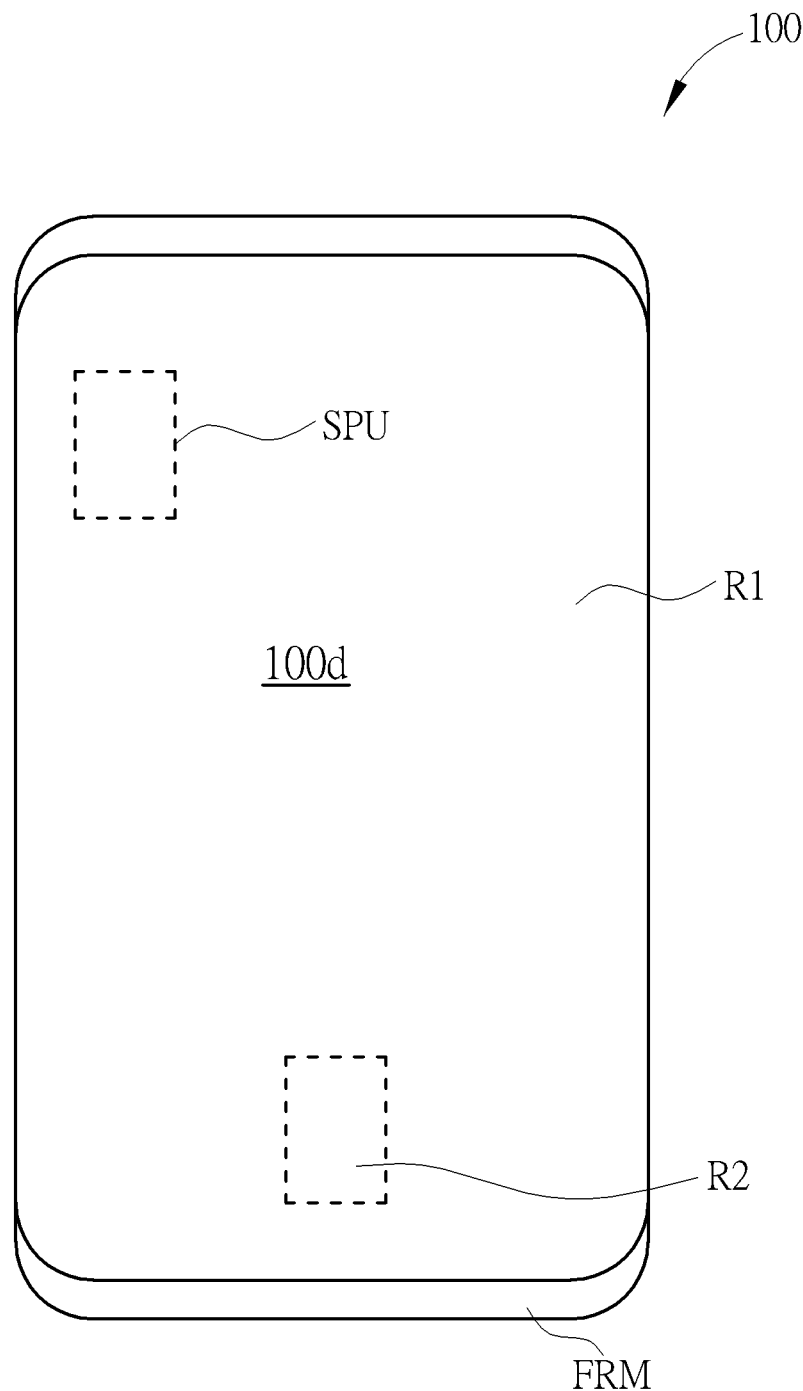
FIG. 21 is an exterior schematic diagram of an embodiment of an electronic device according to the present disclosure.
Figure 22:
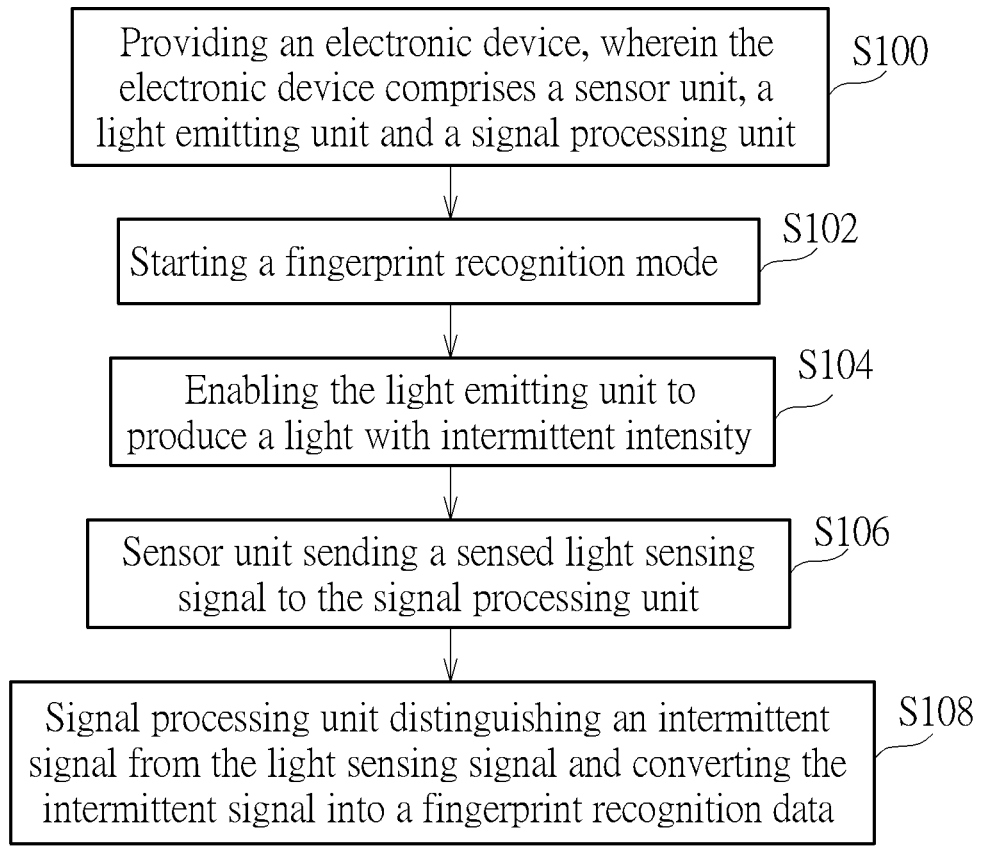
FIG. 22 is a flowchart according to an embodiment of performing fingerprint recognition of an electronic device according to the present disclosure.

Please refer to FIG. 20, FIG. 21 and FIG. 22. FIG. 20 is a schematic diagram of the signal according to an embodiment of a method of performing fingerprint recognition of an electronic device according to the present disclosure. FIG. 21 is an exterior schematic diagram of an embodiment of an electronic device according to the present disclosure. FIG. 22 is a flowchart according to an embodiment of performing fingerprint recognition of an electronic device according to the present disclosure. The electronic device 100 applied to the method of performing fingerprint recognition of the present disclosure may include, but not limited to, the structures in any embodiments or variant embodiments described above. For example, the electronic device 100 may include the first substrate, the second substrate, the sensor unit and the light emitting unit. The first substrate is on a side of the second substrate that is opposite to the display surface 100d, the sensor unit is disposed on the second substrate, and the light emitting unit (e.g., the light source LSR shown in FIG. 8 or the backlight module BLU shown in FIG. 1) is on a side of the second substrate that is opposite to the display surface 100d. The elements of the electronic device 100 described above may refer to the description of other embodiments and related drawings of the present disclosure, not redundantly described herein. As shown in FIG. 21, the display surface 100d may be discriminated into a general display region R1 and a fingerprint recognition region R2. It should be noted that, although the fingerprint recognition region R2 has the function of fingerprint recognition, the fingerprint recognition region R2 still may display images, and the occupied regions and sizes of the display region R1 and the fingerprint recognition region R2 are not limited to those in FIG. 21. In some embodiments, the electronic device 100 may further include a frame FRM and a signal processing unit SPU. The frame FRM is on the outer side of the display surface 100d, and the signal processing unit SPU may be disposed on the back side of the display surface 100d. As shown in FIG. 20, the time period T1 represents that when fingerprint recognition is not been performed yet, the light emitting unit may remain in an "off" state or a long "on" mode (continuously emitting light with uniform intensity). The time period T2 represents the time when the electronic device 100 of the present disclosure is in a fingerprint recognition mode. When the fingerprint recognition mode of the electronic device 100 is started, the light emitting unit or light source for providing the fingerprint recognition light may produce the light with intermittent intensity. For example, the light emitting unit will be turned on or off with fixed time intervals, or the light source has a fixed refresh frame rate. Before the finger touches the electronic device 100 for fingerprint recognition (the time period TA), the sensor unit for performing fingerprint recognition may only receive the ambient light or the background light, and a light sensing signal of intensity S1 may be produced. When the user touches the electronic device 100 with the finger for fingerprint recognition (the time period TB), the sensor unit may further receive the light reflected by the finger, and the intensity of the light sensing signal detected in the time period TB includes the intensity S1 and intensity S2, among which the intensity S2 is generated from the light reflected back from the finger to the sensor unit After the fingerprint recognition is completed and the fingerprint recognition mode is turned off, it gets into the time period T3, the light emitting unit may be turned off or the long "on" mode will be restored. The sensor unit may send the light sensing signal to the signal processing unit SPU, the signal processing unit SPU may distinguish the intermittent signal from the light sensing signal, that is, the signal with intermittent intensity variation in the time period TB, and the signal processing unit SPU may convert the intermittent signal into the fingerprint recognition data. On the other hand, the signal processing unit SPU may further distinguish the continuous signal from the light sensing signal, that is, the light sensing signal obtained in the time period TA and the time period T3, and when the signal processing unit SPU converts the above-described intermittent signal into the fingerprint recognition data, the above-described continuous signal may be excluded. For example, the intensity of the continuous signal can be excluded from the light sensing signal, and the signal intensity after calculating may have a greater intensity difference.

According to the above description, an embodiment of the method of performing fingerprint recognition of the electronic device 100 of the present disclosure includes the following steps:

S100: providing an electronic device, wherein the electronic device comprises a sensor unit, a light emitting unit and a signal processing unit;

S102: starting a fingerprint recognition mode, that is to say, getting into the time T2 in FIG. 20;

S104: enabling the light emitting unit to produce a light with intermittent intensity;

S106: the sensor unit sending a sensed light sensing signal to the signal processing unit SPU; and S108: the signal processing unit SPU distinguishing an intermittent signal from the light sensing signal and converting the intermittent signal into a fingerprint recognition data.

According to the present disclosure, the electronic device may include a sensor unit and at least one light blocking layer. The sensor unit may be used to perform fingerprint recognition, and the at least one light blocking layer is disposed between the sensor unit and the viewing side, that is, the light blocking layer is closer to the display surface than the sensor unit. The light blocking layer may block at least one portion of the sensor unit, and the total amount of ambient light entering the sensor unit may be reduced, thereby increasing the signal to noise ratio to improve the signal sensing effects and the accuracy of fingerprint recognition. The electronic device of the present disclosure may adopt different arrangement to change the relative positions of the light converting element, the sensor, the substrate and one or more light blocking layers, the openings of the light blocking layers, the openings of the insulating layers in different embodiments, and the electronic device with the fingerprint recognition function may be designed according to the actual requirements. In addition, according to the method of fingerprint recognition in the disclosure, the accuracy of the fingerprint recognition is enhanced by deducting the background signals or using the light emitting unit that emits light intermittently.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device viewable from a viewing side, comprising:
   a first substrate;
   a second substrate disposed between the first substrate and the viewing side;
   a display unit disposed between the first substrate and the second substrate;
   a sensor unit disposed on the second substrate; and
   a first light blocking layer disposed between the sensor unit and the viewing side,
   wherein the sensor unit is disposed between the viewing side and the second substrate.

2. The electronic device according to claim 1, further comprising a second light blocking layer disposed between the sensor unit and the display unit.

3. The electronic device according to claim 2, wherein the first light blocking layer and the second light blocking layer have different material.

4. The electronic device according to claim 1, wherein the first light blocking layer comprises an opening overlapping the sensor unit in a top direction of the electronic device.

5. The electronic device according to claim 1, wherein the sensor unit comprises a metal layer adjacent to the display unit and the metal layer is opaque.

* * * * *